United States Patent [19]
Watanabe et al.

[11] Patent Number: 6,014,291
[45] Date of Patent: Jan. 11, 2000

[54] COMPOSITE MAGNETIC HEAD HAVING THIN CONDUCTOR FILM

[75] Inventors: Makoto Watanabe; Seiichi Ogata; Yoshito Ikeda; Kyu Kanno, all of Miyagi, Japan

[73] Assignee: Sony Corporation, Tokyo, Japan

[21] Appl. No.: 08/263,252

[22] Filed: Jun. 21, 1994

Related U.S. Application Data

[63] Continuation of application No. 07/865,854, Apr. 9, 1992, abandoned.

[30] Foreign Application Priority Data

| Apr. 19, 1991 | [JP] | Japan | 3-113831 |
| Apr. 26, 1991 | [JP] | Japan | 3-123032 |
| Apr. 30, 1991 | [JP] | Japan | 3-124628 |
| May 8, 1991 | [JP] | Japan | 3-131648 |

[51] Int. Cl.$^7$ ................................................ G11B 5/265
[52] U.S. Cl. ............................................................ 360/121
[58] Field of Search ............................................ 360/121, 124

[56] References Cited

U.S. PATENT DOCUMENTS

| 3,479,662 | 11/1969 | Bradford et al. | 360/124 |
| 4,652,955 | 3/1987 | Niwa et al. | 360/121 |
| 4,719,527 | 1/1988 | Yoshisato et al. | 360/121 |
| 4,860,132 | 8/1989 | Lorteise | 360/121 |
| 4,928,186 | 5/1990 | Matsumoto et al. | 360/21 |
| 4,939,608 | 7/1990 | Okamura et al. | 360/121 |
| 4,941,064 | 7/1990 | Tottori et al. | 360/121 |
| 5,079,658 | 1/1992 | Sakai et al. | 360/121 |

FOREIGN PATENT DOCUMENTS

| 0224342 | 6/1987 | European Pat. Off. . | |
| 0 412 261 | 2/1991 | European Pat. Off. . | |
| 0421261 | 4/1991 | European Pat. Off. . | |
| 0104409 | 5/1986 | Japan | 360/124 |
| 202205 | 1/1987 | Japan | 360/124 |

OTHER PUBLICATIONS

Patent Abtstracts of Japan vol. 006, No. 241 (p–158), Nov. 30, 1982 & JP-A-57141012 (Hitachi Seisakusho KK), Sep. 1, 1982 *abstract*.

Patent Abstracts of Japan vol. 006, No. 082 (p–116), May 20, 1982 & JP-A-57018015 (Hitachi Ltd), Jan. 29, 1982 *abstract*.

Patent Abstracts of Japan vol. 013, No. 087 (p–835), Feb. 28, 1989 & JP-A-63269309 (Toshiba Corp), Nov. 7, 1988 *abstract*.

(List continued on next page.)

*Primary Examiner*—David D. Davis
*Attorney, Agent, or Firm*—Frommer Lawrence & Haug, LLP.; William S. Frommer

[57] ABSTRACT

A magnetic head includes a first magnetic core half having a coil winding groove coupled to a second magnetic core half having an auxiliary core element accommodated in the coil winding groove, such that a magnetic gap is defined between joining faces of the first and second core halves. Alternatively, a composite magnetic head includes a pair of magnetic heads that have magnetic gaps with different azimuth angles from each other and disposed closely in an opposing relationship to each other in a head feeding direction so as to define respective track widths and a track pitch. A thin conductor film is formed on at least one of a pair of opposing faces of the magnetic heads for intercepting leakage fluxes from the magnetic gap of the other magnetic head. The thin conductor film has a thickness and is located such that the track pitch formed by the magnetic heads is substantially independent of the thickness of the thin conductor film. A method of producing a magnetic head includes forming a track width restricting groove on each of a pair of head core blocks. The blocks are fused together with glass when aligned with the restricting groove. An additional groove is formed at an angle substantially equal to the azimuth angle of the magnetic gap on at least one of the pairs of faces on the blocks and the blocks are cut in a direction substantially perpendicular to the bottom face of the additional groove.

5 Claims, 30 Drawing Sheets

OTHER PUBLICATIONS

Patent Abstracts of Japan vol. 010, No. 284 (p–501), Sep. 26, 1986 & JP–A–61104311 (NEC Kansai Ltd), May 22, 1986 *abstract*.

Patent Abstracts of Japan vol. 10, No. 74 (P–439) (2131) Mar. 25, 1986 & JP–A–60 211 611 (Hitachi Seisakusho K.K.) Oct. 24, 1985.

Patent Abstracts of Japan vol. 12, No. 240 (P–727) Jul. 8, 1988 & JP–A–63 032 702 (Fuji Photo Film Co. Ltd.) Feb. 12, 1988.

Patent Abstracts of Japan vol. 14, No. 162 (P–1029) (4105) Mar. 29, 1990 & JP–A–02–018 706 (Sharp Corp.) Jan. 23, 1990.

Patent Abstracts of Japan vol. 12, No. 383 (P–770) Oct. 13, 1988 & JP–A–63 127 409 (Mitsubishi Electric Corp.) May 1988.

Database WPI section Ch, Week 8905, Derwent Publications Ltd. London, GB; Class L03, AN 89–036978 & JP–A–63 311 615 (Hitachi KK) Dec. 20, 1988.

Patent Abstracts of Japan vol. 9, No. 20 (P–330) (1743) Jan. 26, 1985 & JP–A–59 165 227 (Tokyo Denki K.K.) Sep. 18, 1984.

Patent Abstracts of Japan vol. 13, No. 316 (P–900) (3664) Jul. 18, 1989 & JP–A–01 086 308 (Sanyo Electric Co. Ltd.) Mar. 31, 1989.

Journal of the Audio Engineering Society vol. 8, No. 3, Jul. 1960, New York US pp. 165–169 W.S. Lathyam 'A Full=Track, Stereophonic, Magnetic Record–Reproduct Head' p. 167, right col., line 9–line 22 p. 167; figure 3.

Patent Abstracts of Japan vol. 10, No. 152 (P–462) (2208) Jun. 3, 1986 & JP–A–61 005 412 (Hitachi Seisakusho K.K.) Jan. 11, 1986.

Patent Abstracts of Japan vol. 8, No. 27 (P–252) (1464) Feb. 4, 1984 & JP–A–58 182 123 (Hitachi Seisakusho K.K.) Oct. 25, 1983.

Patent Abstracts of Japan vol. 13, No. 520 (P–963) Nov. 21, 1989 & JP–A211 202 (Victor Co. of Japan Ltd.) Aug. 24, 1989.

Patent Abstracts of Japan vol. 13, No. 389 (P–925) (3737) Aug. 29, 1989 & JP–A–11 37 412 (TDK Corp) May 30, 1989.

Patent Abstracts of Japan vol. 13, No. 75 (P–831) (3423) Feb. 21, 1989 & JP–A–63 259 809 (Victor Co. of Japan Ltd.) Oct. 26, 1988.

F I G. 14
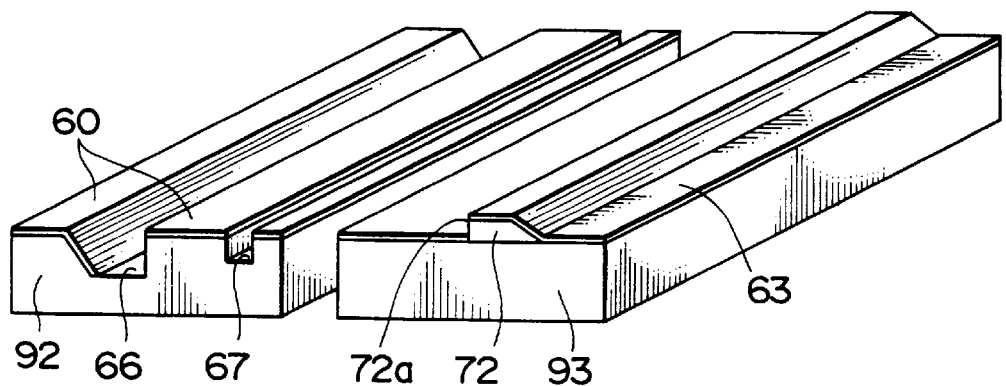
F I G. 15
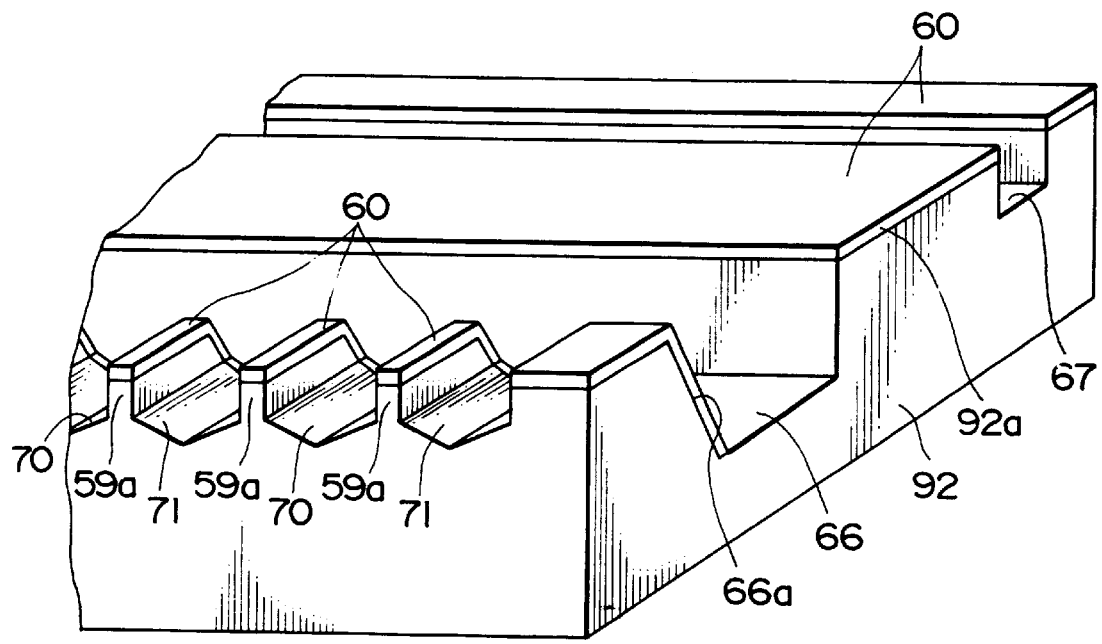

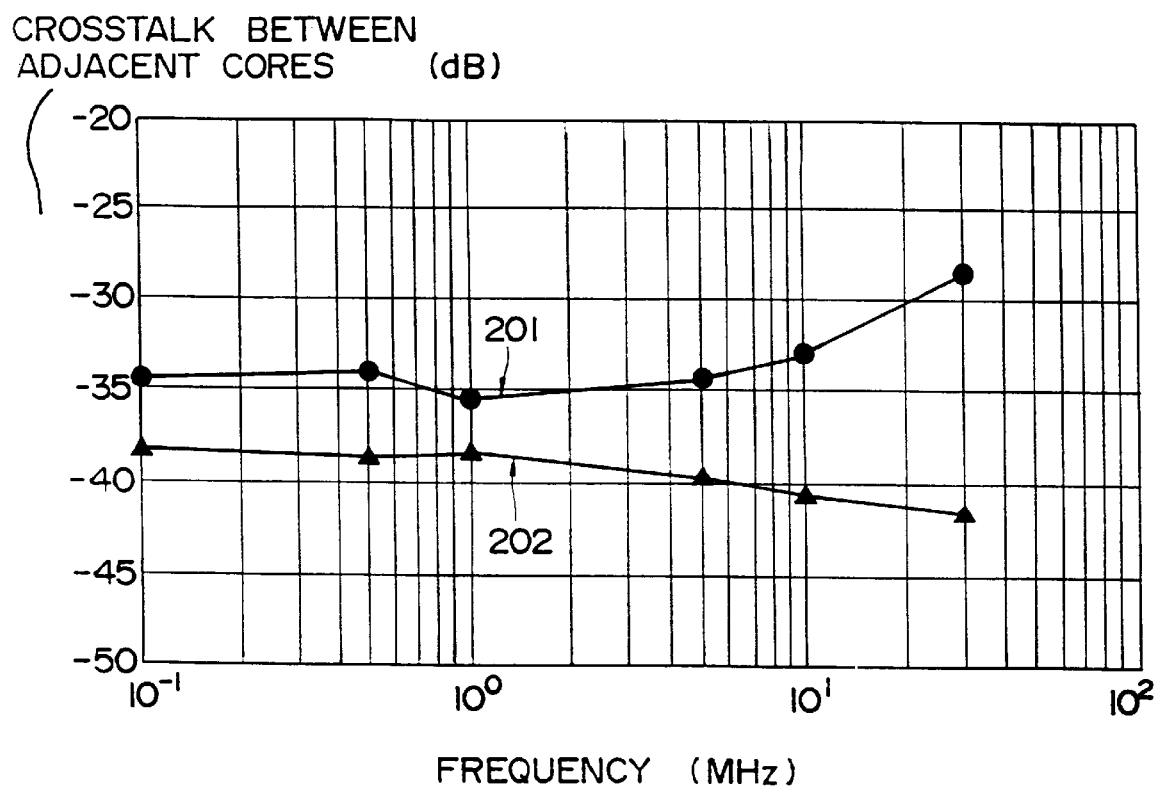
F I G. 23

F I G. 41
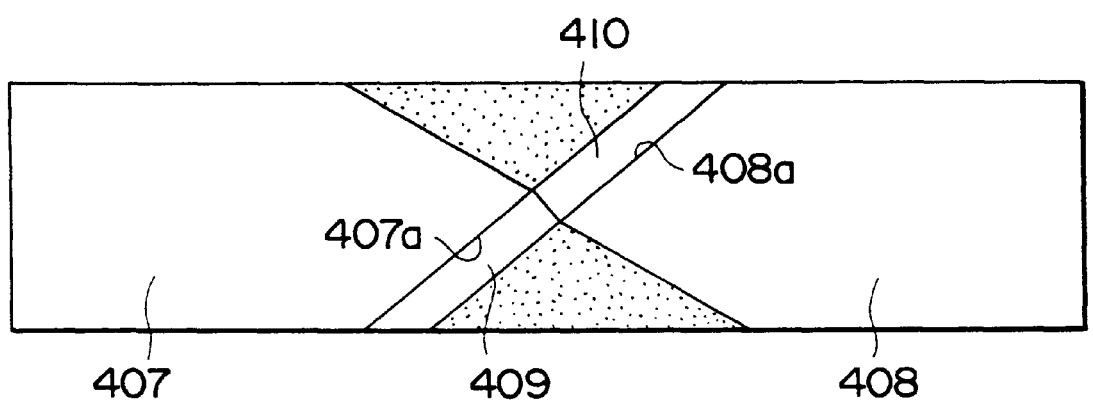

COMPOSITE MAGNETIC HEAD HAVING THIN CONDUCTOR FILM

This application is a continuation of application Ser. No. 07/865,854, filed Apr. 9, 1992 now abandoned.

FIELD OF THE INVENTION

This invention relates to a composite magnetic head for use with a digital video tape recorder or the like and a process of producing the same.

DESCRIPTION OF THE RELATED ART

In recent years, digital video tape recorders of the component type of the D1 format and digital video tape recorders of the composite type of the D2 format for a broadcasting station have been put into practical use as digital video tape recorders for converting an analog color video signal into a digital signal and recording the digital signal onto a magnetic medium such as a magnetic tape.

However, since those digital video tape recorders are designed on the premise that they are commonly used in a broadcasting station, the highest precedence is given to the quality of picture. Accordingly, such digital video tape recorders are constructed such that they may record a digital color video signal, which is obtained by analog to digital conversion of each one sample into an 8-bit digital signal, substantially without compressing the same. Consequently, with such video tape recorders, the recording density of data is about 20.4 $\mu m^2$/bit or so, and even when a magnetic tape of 19 mm wide is employed, only the reproduction time of 1.5 hours or so can be obtained. Accordingly, the digital video tape recorders are not suitably used as video tape recorders for consumer use.

In the meantime, if, for example, a signal of the shortest wavelength of 0.5 $\mu m$ is recorded onto a track of the width of 5 $\mu m$, then the recording density of 1.25 $\mu m^2$/bit can be realized. And, if a method of compressing record information in such a form as will provide only a little reproduction distortion is employed in addition, then recording and reproduction for a long period of time can be achieved even if a magnetic tape of a width of 8 mm or less is employed.

However, in a conventional video tape recorder for consumer use or the like wherein, for example, a pair of magnetic heads having different azimuth angles are mounted in an angularly spaced relationship by 180 degrees from each other on a rotary drum such that they individually perform a recording or reproducing operation, an abnormal track pattern wherein a track recorded by a preceding one of the magnetic heads and another track recorded by the following magnetic head do not extend in parallel to each other but partially overlap with each other which is likely produced by the rotary drum which is mounted eccentrically or the like. Then, if such abnormal track pattern is produced, then the signal recorded by the preceding magnetic head is partially erased with a signal recorded by the following magnetic head, which results in the disadvantage that a sufficient reproduction output cannot be obtained from the recorded signal and the bit error rate may be very high.

In such a case, it is an effective solution that a composite magnetic head wherein a pair of magnetic heads having opposite azimuths to each other are, for example, adhered to a single head base is used to perform simultaneous recording and/or reproduction by the magnetic heads. In this instance, the distance between magnetic gaps of the two magnetic heads must necessarily be minimized in order to achieve reproduction for a long period of time and after recording.

Further, if proximity crosstalk is taken into consideration, then the azimuth angles must necessarily be made large. However, if such construction is employed, then the width of mutually opposing portions of magnetic cores of the opposing magnetic heads can have, for example, only a maximum of 50 $\mu m$ which is not sufficient. Consequently, the head efficiency is low due to a small sectional area of the magnetic core and a sufficiently low bit error rate cannot be achieved.

Further, if the distance GL between the magnetic gaps $g_1$ and $g_2$ of such two magnetic heads 101 and 102 shown in FIG. 24 is small, then the distance L between opposing ones 105 and 107 of magnetic cores 104, 105 and 106, 107 which define the magnetic gaps $g_1$ and $g_2$, respectively, is small, and accordingly, the problem of leakage fluxes occurs. In particular, magnetic fluxes produced from, for example, the magnetic gap $g_1$ will enter the other magnetic gap $g_2$ and cause mutual interference (crosstalk) with a recording or reproduction signal of the latter magnetic gap $g_2$. As a result, the recording or reproduction signal is deteriorated and good recording or reproduction cannot be achieved.

It is a conventional solution to the problem that a magnetic intercepting plate for intercepting leakage fluxes is disposed between the magnetic heads. It is another solution that coils are wound in the 8-shaped configuration on the magnetic heads such that signal components caused by leakage fluxes may be coupled in the reverse phase to each other by the 8-shaped coils.

However, in order to achieve recording or reproduction of a greater amount of data, the distance between the magnetic heads advance should be minimized. Accordingly, it is both difficult to provide a magnetic intercepting plate between a small magnetic gap and to wind 8-shaped coils on magnetic heads.

Further, in order to realize recording and reproduction for a long period of time, it is necessary to adopt the construction using a pair of magnetic heads to effect simultaneous recording and/or reproduction onto magnetic tracks of a magnetic tape and capable to adopt azimuth recording of so-called solid writing having no guard band, which is adopted by video tape recorders and so forth for public welfare. Further, in order to perform recording or reproduction with the track width of 5 $\mu m$, it is necessary to adopt an ATF (automatic tracking) system which is adopted in 8-mm video tape recorders and so forth and wherein tracking upon reproduction is performed while picking up a signal of a neighboring track.

When such automatic tracking system is adopted to effect recording and/or, reproduction is performed adopting such ATF system, for example, as shown in FIG. 25, a pair of magnetic heads 101 and 102 having magnetic gaps $g_1$ and $g_2$ having different azimuth angles are disposed adjacent each other at a predetermined gap distance GL in an opposing relationship in a head feeding direction on magnetic tape 103. The magnetic gaps $g_1$ and $g_2$ are disposed at positions displaced by a predetermined distance in a track pitch direction such that individual tracks recorded thereby may partially overlap with each other. It is to be noted that, in order to achieve the record track of 5 $\mu m$, preferably the track width of each of the magnetic heads 101 and 102 is set to 7 $\mu m$ or so taking automatic tracking into consideration.

A record pattern by the magnetic heads disposed in such a manner as described above will be recorded such that, as shown in FIG. 42, a portion 406 of a record track 404 on a magnetic tape 403 recorded by the preceding magnetic head 102, that is, a portion indicated by hatching lines in FIG. 42, is overwritten by another record track 405 recorded by the following magnetic head 101. As a result, a track pitch of 5 μm is achieved as shown in FIG. 42. It is to be noted that such portion 406 as described above will be hereinafter referred to as overwritten portion.

SUMMARY OF THE INVENTION

It is an object of the present invention to provide a composite magnetic head which is high in efficiency.

It is another object of the present invention to provide a composite magnetic head wherein mutual interference of recording or reproduction signals of magnetic heads is minimized to assure good recording and reproduction.

It is a further object of the present invention to provide a magnetic head producing method by which a magnetic head having an azimuth can be produced readily.

It is a still further object of the present invention to provide a composite magnetic head wherein leakage fluxes from a magnetic gap are minimized to suppress production of a gray zone caused by size erasing.

In order to attain the objects, according to an aspect of the present invention, there is provided a magnetic head, which comprises a first magnetic core half having a coil winding groove formed thereon, a second magnetic core half joined to the first magnetic core half to form a unitary member such that a magnetic gap is defined between joining faces of the first and second magnetic core halves, and an auxiliary core element disposed on the second magnetic core half and accommodated in the coil winding groove.

With the magnetic head, the auxiliary core element accommodated in the coil winding groove is integrated with the second magnetic core half, on which the coil winding groove is not formed, to assure a greater sectional area for a core constituted from the first and second magnetic core halves. Accordingly, a high head efficiency is assured.

According to another aspect of the present invention, there is provided a composite magnetic head, which comprises a pair of magnetic heads having magnetic gaps having different azimuth angles from each other and disposed closely in an opposing relationship to each other in a head feeding direction, and a thin conductor film formed on at least one of a pair of faces of the magnetic heads opposing to each other for intercepting leakage fluxes from the magnetic gap of the other magnetic head.

With the composite magnetic head, since the thin conductor film for intercepting leakage fluxes from the magnetic gap of the other magnetic head is formed on at least one of the pair of opposing faces of the magnetic heads disposed closely in an opposing relationship to each other in the head feeding direction, leakage fluxes from the other magnetic head are intercepted by the thin conductor film. Consequently, mutual interference between recording or reproduction signals of the magnetic heads are decreased, and good recording and reproduction are assured.

According to a further aspect of the present invention, there is provided a method of producing a magnetic head, which comprises the steps of forming a track width restricting groove on each of a pair of head core blocks, fusion joining the head core blocks to each other with glass while the head core blocks are positioned with the track width restricting grooves aligned with each other, forming, on at least one of a pair of faces of the core blocks remote from joining faces at which the head core blocks are joined to each other, a groove at an angle substantially equal to an azimuth angle of a magnetic gap of a magnetic head to be produced, and cutting the head core blocks in a direction substantially perpendicular to a bottom face of the groove to form a head chip.

With the magnetic head producing method, since a groove is formed, on at least one of a pair of faces of a pair of core blocks integrally joined to each other which are remote from joining faces at which the core blocks are joined to each other and a magnetic gap is to be formed, at an angle substantially equal to an azimuth angle of the magnetic gap and then a head chip is cut in a direction substantially perpendicular to a bottom face of the groove, the bottom face of the groove is not parallel to the magnetic gap. Consequently, an end face of a thus obtained magnetic head in the head feeding direction is not parallel to the magnetic gap, and accordingly, the magnetic gap has an azimuth.

According to a still further aspect of the present invention, there is provided a composite magnetic head, which comprises a pair of magnetic heads having magnetic gaps having different azimuth angles from each other and disposed closely in an opposing relationship to each other in a head feeding direction, and a pair of ferromagnetic thin metal films disposed on each of the magnetic heads such that they extend obliquely to the magnetic gap of the magnetic head and are abutted with each other substantially symmetrically with respect to the magnetic gap, the magnetic gap being provided between abutting faces of the ferromagnetic thin metal films each of which has a peaked portion, the magnetic heads being disposed such that part of a record pattern recorded onto a magnetic record medium by a preceding one of them is recorded or reproduced in an overwriting relationship by a following one of them, the peaked portion at the abutting faces of the ferromagnetic thin metal films being disposed on the overwritten side on which overwriting occurs.

With the composite magnetic head, since the peaked portion at the abutting faces of the ferromagnetic thin metal films which are abutted with each other substantially symmetrically with respect to the magnetic gap is disposed on the overwritten side on which overwriting occurs, to whichever side the ferromagnetic thin metal films are displaced in a track widthwise direction, those of the ferromagnetic thin metal films which are displaced to the overwritten side and the other ferromagnetic thin metal films opposing to the former ferromagnetic thin metal films do not define an acute angle between them. Accordingly, leakage magnetic fields from edge portions of the ferromagnetic thin metal films displaced to the overwritten side are little, and consequently, occurrence of a gray zone by side-erasure is prevented or minimized.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIGS. 11 to 18 are schematic perspective views showing different successive steps of a process of producing the magnetic head shown in FIG. 8;

FIG. 23 is a diagram illustrating mutual interference when a magnetic tape is recorded and/or reproduced by the composite magnetic head of FIG. 21;

FIG. 41 is a schematic front elevational view showing a magnetic head wherein a magnetic gap is formed between abutting faces of oblique films of ferromagnetic thin metal films as viewed from a contacting face side of the magnetic head;

DETAILED DESCRIPTION OF THE PREFERRED EMBODIMENTS

Before preferred embodiments of the present invention are described, a method of compressing record information in such a form as will provide only a little reproduction distortion will be described with reference to the drawings. The present method involves conversion of an input digital picture image signal into data blocks each consisting of a plurality of picture element data, compression coding of data of the blocks, channel coding of the thus compression coded data, and recording of the thus channel coded data onto a magnetic tape by means of a composite magnetic head mounted on a rotary drum.

Figure 1:
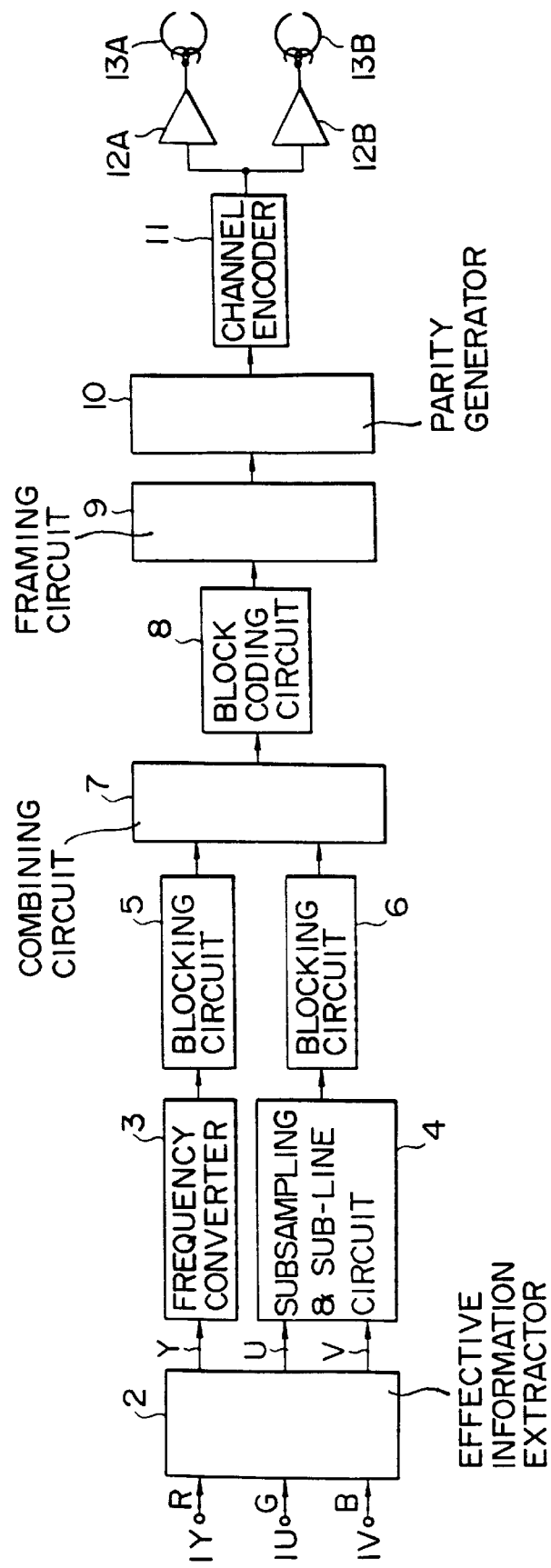
FIG. 1 is a block diagram showing general construction of a recording circuit of a signal processing circuit which compresses digital picture image information in such a form as will provide only a little reproduction distortion.

Referring first to FIG. 1, there is shown an entire recording circuit of a signal processing circuit which performs such compressing method as described just above. The recording circuit receives, at input terminals 1Y, 1U and 1V, a digital brightness signal Y and digital color difference signals U and V, respectively. The digital brightness signal Y and digital color difference signals U and V are formed from three primary color signals R. G and B. In this instance, the clock rates of the individual signals are equal to the frequencies of the individual components of the D1 format. In particular, the individual sampling frequencies are 13.5 MHz and 6.75 MHz, and the bit numbers per sample of them are commonly 8 bits. Accordingly, the amount of data of signals supplied to the input terminals 1Y, 1U and 1V is about 216 Mbps. The input data of the amount are compressed to about 167 Mbps by an effective information extracting circuit 2 which removes data of the signals for a blanking time to extract only information of effective regions.

The brightness signal Y among outputs of the effective information extracting circuit 2 is supplied to a frequency converting circuit 3, at which the sampling frequency is converted from 13.5 MHz to three fourths that frequency. For example, a thinning out filter is used as the frequency converting circuit 3 so as to prevent production of folded distortion. An output signal of the frequency converting circuit 3 is supplied to a blocking circuit 5, in which the order of brightness data is converted into the order of blocks. The blocking circuit 5 is provided for a block coding circuit 8 provided at a following stage.

Figure 3:
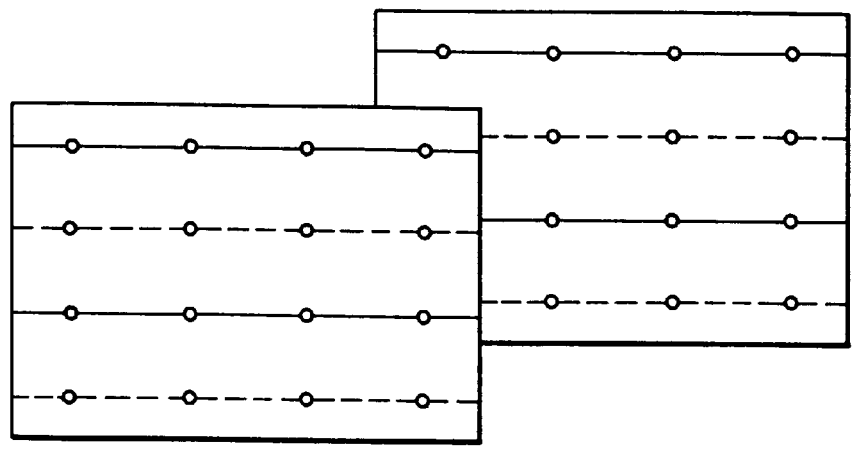
FIG. 3 is a diagram illustrating a block for the block coding.

FIG. 3 illustrates detailed structure of a block of data for coding. The present structure is in the form of a three-dimensional block, and a large number of unit blocks (of 4 lines×4 picture elements×2 frames) are formed as shown in FIG. 3 by dividing a screen which extends, for example, across 2 frames. It is to be noted that, in FIG. 3, a solid line indicates a line of an odd-numbered field while a broken line indicates a line of an even-numbered field.

Figure 4:
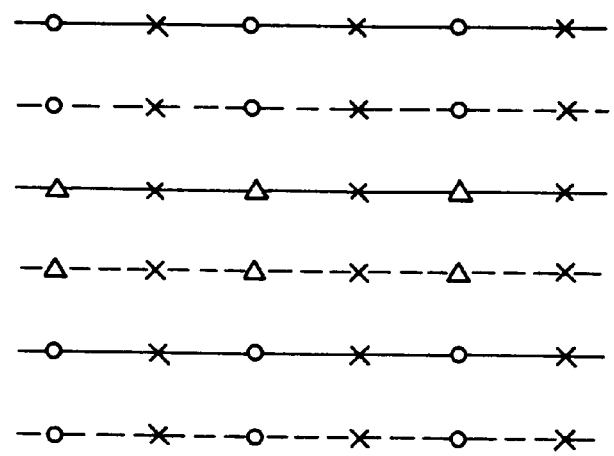
FIG. 4 is a diagram illustrating sub-sampling and sub-lining.

Meanwhile, the two color difference signals U and V among the outputs of the effective information extracting circuit 2 are supplied to the sub-sampling and sub-lining circuit 4, in which the sampling frequencies are converted from 6.75 MHz to one half and then the two digital color signals are selected alternately for every other line and combined into data of a channel. Accordingly, a line sequential digital color difference signal is obtained from the sub-sampling and sub-lining circuit 4. Picture element construction of a sub-sampled and sub-lined signal by the sub-sampling and sub-lining circuit 4 is shown in FIG. 4. In FIG. 4, the mark ○ denotes a sub-sampled picture element of the first color difference signal U; Δ denotes a sub-sampled picture element of the second color difference signal V; and X denotes a position of a picture element thinned out by sub-sampling.

The line sequential output signal of the sub-sampling and sub-lining circuit 4 is supplied to another blocking circuit 6. In the blocking circuit 6, the color difference data in the order of scanning of a television signal are converted into data in the order of blocks similarly as in the blocking circuit 5. The blocking circuit 6 converts the color difference data into a structure of blocks (of 4 lines×4 picture elements×2 frames) similarly to the blocking circuit 5. Output signals of the blocking circuits 5 and 6 are supplied to a combining circuit 7.

At the combining circuit 7, the brightness signal and color difference signals after conversion in the order of blocks are converted into data for 1 channel, and an output signal of the combining circuit 7 is supplied to the block coding circuit 8. A coding circuit (referred to as ADRC) adapted for a dynamic range for each block as hereinafter described, a DCT (Discrete Cosine Transforming) circuit and so forth can be applied for the block coding circuit 8. An output signal of the block coding circuit 8 is supplied to a framing circuit 9, at which it is converted into data of a frame structure. At the framing circuit 9, a change from clocks for the picture element system to clocks for a recording system is performed.

An output signal of the framing circuit 9 is supplied to a parity generating circuit 10 for an error correction code, at which a parity for an error correction code is generated. An output signal of the parity generating circuit is supplied to a channel encoder 11, at which such channel coding as will reduce the low frequency band portion of record data is performed. An output signal of the channel encoder 11 is supplied by way of a pair of recording amplifiers 12A and 12B and rotary transformers (not shown) to a pair of magnetic heads 13A and 13B, by means of which they are recorded onto a magnetic tape. It is to be noted that an audio signal and a video signal are compression coded separately from each other and supplied to the channel encoder 11.

As a result of the signal processing described above, the input data amount of 216 Mbps is reduced to about 167 Mbps by extraction only for an effective scanning period, and this is further reduced to 84 Mbps by frequency conversion as well as sub-sampling and sub-lining. The data are compressed to about 25 Mbps by compression coding by the block coding circuit 8, and the amount of record data is 31.56 Mbps or so as a result of addition of additional information such as parities, audio signals and so forth after then.

Figure 2:
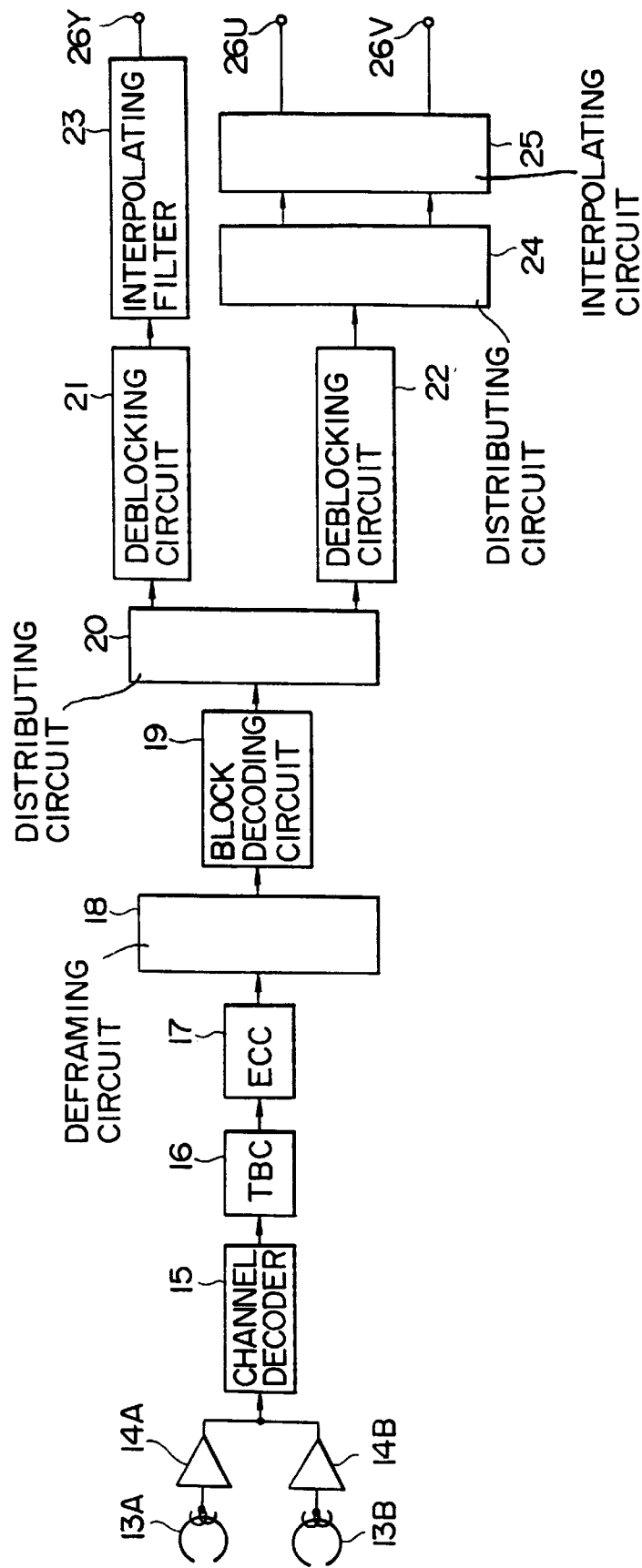
FIG. 2 is a similar view but showing general construction of a reproducing circuit of such signal processing circuit.

Referring now to FIG. 2, there is shown a reproducing circuit of the signal processing circuit. The reproducing circuit includes the magnetic heads 13A and 13B for reproducing a magnetic tape which has been recorded by the recording circuit described above. Reproduction signals from the magnetic heads 13A and 13B are supplied to a channel decoder 15 by way of the rotary transformers and a pair of reproducing amplifiers 14A and 14B, respectively. Decoding of the reproduction channel coded signal is performed at the channel decoder 15, and an output signal of the channel decoder 15 is supplied to a TBC (time base correcting) circuit 16. At the TBC circuit 16, time base variable components of the reproduction signal are removed. The reproduction data from the TBC circuit 16 are supplied to an ECC circuit 17, at which error correction and error modification are performed using an error correction code. An output signal of the ECC circuit 17 is supplied to a deframing circuit 18.

Different components of the block coded data are separated from each other and a change from clocks of the recording system to clocks of the picture element system is performed by the deframing circuit 18. The individual data separated by the deframing circuit 18 are supplied to a block decoding circuit 19, at which the restored data from the deframing circuit 18 corresponding to original data are decoded for each block. The decoded data are then supplied to a distributing circuit 20. At the distributing circuit 20, the decoded data are separated into a brightness signal and a color difference signal. The brightness signal and the color difference signal are supplied to a pair of deblocking circuits 21 and 22, respectively. The deblocking circuits 21 and 22 convert the decoded data in the order of blocks into data in the order of raster scanning reversely to that of the blocking circuits 5 and 6 in the recording circuit.

The decoded brightness signal from the deblocking circuit 21 is supplied to an interpolating circuit 23. At the interpolating circuit 23, the sampling rate of the brightness signal is converted from 3 fs to 4 fs (4 fs=13.5 MHz). A digital brightness signal Y from the interpolating circuit 23 is taken out by way of an output terminal 26Y.

Meanwhile, the digital color difference signal from the deblocking circuit 22 is supplied to the distributing circuit 24, at which the line sequential digital color difference signal U and V is separated into digital color difference signals U and V, respectively. The digital color difference signals U and V from the distributing circuit 24 are supplied to an interpolating circuit 25, at which they are interpolated individually. The interpolating circuit 25 interpolates data of thinned out lines and picture elements using the restored picture element data, and digital color difference signals U and V having the sampling rate of 4 fs are obtained from the interpolating circuit 25 and taken out by way of output terminals 26U and 26V, respectively.

An ADRC (Adaptive Dynamic Range Coding) encoder is employed as the block coding circuit 8 described above. Such ADRC detects a maximum value MAX and a minimum value MIN among a plurality of picture element data included in each block, detects a dynamic range DR of the block from the maximum value MAX and minimum value MIN, performs coding adapted to the dynamic range DR and performs re-quantization with a number of bits smaller than the number of bits of original picture element data. The block coding circuit 8 may be otherwise constructed such that DCT (Discrete Cosine Transformation) of picture element data of each block is performed first and then coefficient data obtained by such DCT are quantized, whereafter the quantized data are run length Huffman coded to obtain compressed codes.

Figure 5:
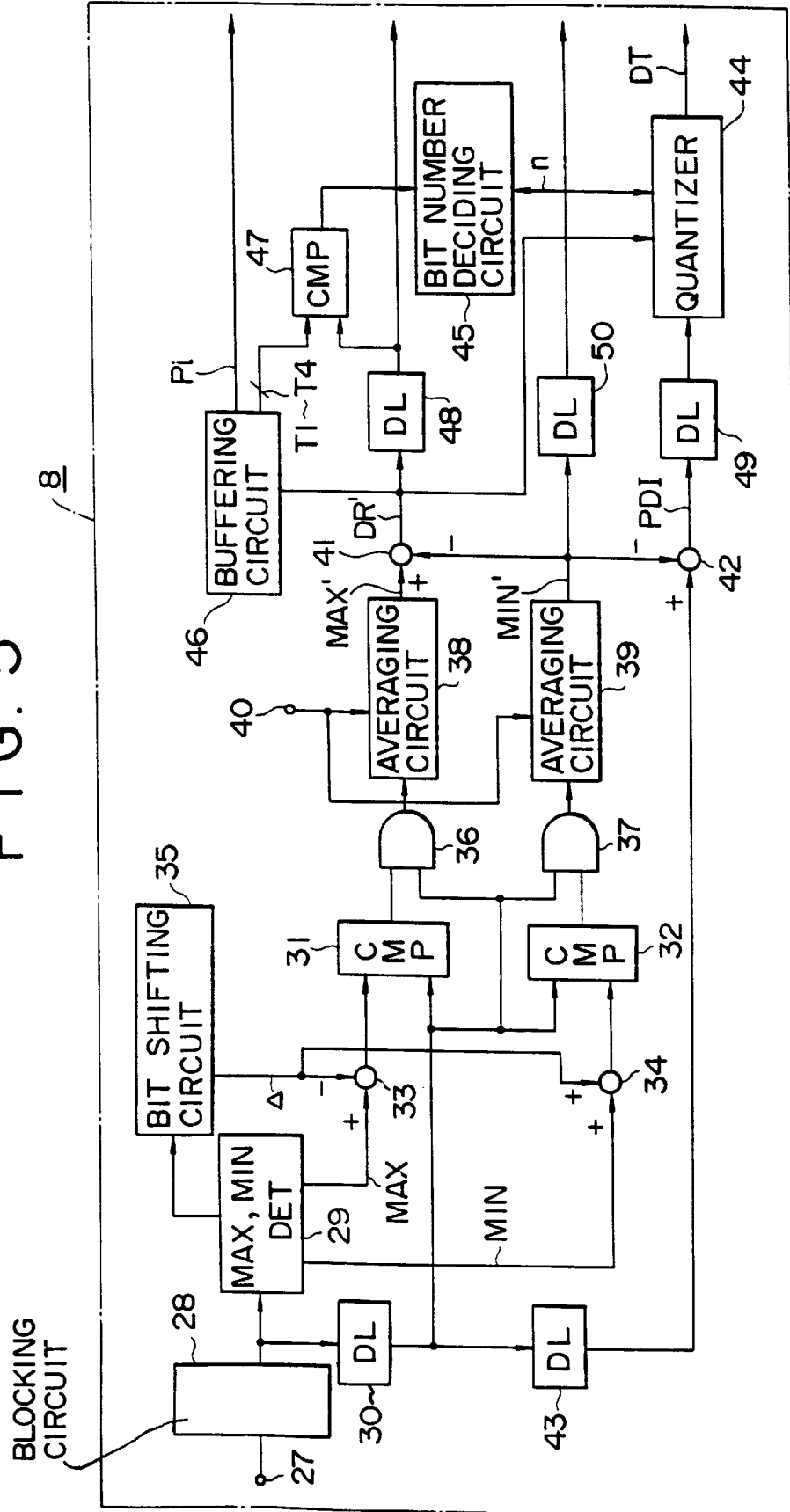
FIG. 5 is a block diagram showing a block coding circuit of the recording circuit shown in FIG. 1.

Referring now to FIG. 5, there is shown an encoder which employs an ADRC encoder and does not cause deterioration in picture quality even by multi-dubbing. The encoder shown receives, at an input terminal 27 thereof, a digital video signal, that is, a digital color difference signal, wherein, for example, one sample is quantized into 8 bits, from the combining circuit 7. The blocked data from the input terminal 27 are supplied to a maximum and minimum value detecting circuit 29 and a delay circuit 30. The maximum and minimum value detecting circuit 29 detects a minimum value MIN and a maximum value MAX for each block. The delay circuit 30 delays the input data by a time required for such detection of a maximum value and a minimum value. The picture element data from the delay circuit 30 are supplied to a pair of comparator circuits 31 and 32.

The maximum value MAX from the maximum and minimum value detecting circuit 29 is supplied to a subtracting circuit 33 while the minimum value MIN is supplied to an adding circuit 34. A value ($\Delta=\frac{1}{16}$ DR) of a quantization step width when non-edge matching quantization is performed in a fixed 4-bit length is supplied from a bit shifting circuit 35 to the subtracting circuit 33 and adding circuit 34. The bit shifting circuit 35 is constructed so as to shift the dynamic range DR by 4 bits so as to perform a dividing operation of $\frac{1}{16}$. A threshold value of (MAX$-\Delta$) is outputted from the subtracting circuit 33 while another threshold value of (MIN$+\Delta$) is outputted from the adding circuit 34. The threshold values from the subtracting circuit 33 and adding circuit 34 are supplied to the comparator circuits 31 and 32, respectively. It is to be noted that the value $\Delta$ defining the threshold values is not limited to the quantizing step width but may be a fixed value corresponding to a noise level.

An output signal of the comparator circuit 31 is supplied to an AND gate 36 while an output signal of the comparator circuit 32 is supplied to another AND gate 37. Output data from the delay circuit 31 are supplied to both of the AND gates 36 and 37. The output signal of the comparator circuit 31 presents a high level when the input data, that is, the output data from the delay circuit 31, are higher than the threshold value from the subtracting circuit 33. Consequently, those picture element data of the input data which are included in a maximum level range of (MAX to MAX$-\Delta$) are extracted at an output terminal of the AND gate 36. On the other hand, the output signal of the comparator circuit 32 presents a high level when the input data are lower than the threshold value from the adding circuit 34. Consequently, those picture data of the input data which are included in a minimum level range of (MIN to MIN$+\Delta$) are extracted at an output of the AND gate 37.

An output signal of the AND gate 36 is supplied to an averaging circuit 38 while an output signal of the AND gate 37 is supplied to another averaging circuit 39. The averaging circuits 38 and 39 calculate average values for each block, and a reset signal for a period of a block is supplied from a terminal 40 to both of the averaging circuits 38 and 39. An average value MAX' of picture data belonging to the maximum level range of (MAX to MAX$-\Delta$) is obtained from the averaging circuit 38 while another average value MIN' of picture element data belonging to the minimum level range of (MIN to MIN$+\Delta$) is obtained from the averaging circuit 39. The average value MIN' is subtracted from the average value MAX' by a subtracting circuit 41, from which a dynamic range DR' is obtained.

The average value MIN' is supplied also to another subtracting circuit 42, at which the average value MIN' is subtracted from the input data received by way of a delay circuit 43 by the subtracting circuit 42 so that data PDI after removal of the minimum value are formed. The data PDI and modified dynamic range DR' are supplied to a quantizing circuit 44. The present block coding circuit 8 is in the form of a variable length ADRC (Adaptive Dynamic Range Coding) encoder wherein the number n of bits allotted to quantization is one of 0 bit (code signal is not transferred), 1 bit, 2 bits, 3 bits and 4 bits and edge matching quantization is performed. The allotted bit number n is decided for each block by a bit number deciding circuit 45, and data of the bit number n are supplied to the quantizing circuit 44.

The variable length ADRC encoder can perform coding of a higher efficiency by decreasing the allotted bit number n at a block where the dynamic range DR' is comparatively small but by increasing the allotted bit number n at another block where the dynamic range DR' is comparatively large. In particular, if the threshold values for deciding the bit number n are T1 to T4 (T1<T2<T3<T4), then a code signal is not transferred but only information of the dynamic range DR' is transferred at a block wherein the dynamic range is DR'<T1: at a block wherein the dynamic range is T1$\leq$DR'<T2, the allotted bit number n is set to n=1; at a block wherein the dynamic range is T2$\leq$DR'<T3, the allotted bit number n is set to n=2; at a block wherein the dynamic range is T3$\leq$DR'<T4, the allotted bit number n is set to n=3; and at a block wherein the dynamic range is DR'$\geq$T4, the allotted bit number n is set to n=4.

In such variable length ADRC encoder, the amount of information to be generated can be controlled (so-called buffering) by changing the threshold values T1 to T4. Accordingly, the variable length ADRC encoder can be applied to such a transmission line such as a digital video tape recorder of the present invention for which it is required to make the amount of information to be generated per one field or per one frame a fixed value.

In a buffering circuit 46 for deciding the threshold values T1 to T4 for making the amount of information to be generated a fixed value, a plurality of, for example, 32, sets of threshold values (T1, T2, T3 and T4) are prepared in advance, and such sets of the threshold values are identified from each other by a parameter code Pi (i=0, 1, 2, . . . , 31). The sets of the threshold values are set such that the amount of information to be generated decreases monotonically as the number i of the parameter code Pi increases. However, the picture quality of a restored picture image deteriorates as the amount of information generated decrease.

Threshold values T1 to T4 from the buffering circuit 46 are supplied to a comparator circuit 47 while the dynamic range DR' is supplied by way of a delay circuit 48 to the comparator circuit 47. The delay circuit 48 delays the dynamic range DR' by a time required for a set of threshold values to be decided by the buffering circuit 46. At the comparator circuit 47, the dynamic range DR' of the block and the individual threshold values are compared with each other, and a comparison output is supplied to the bit number deciding circuit 45, at which the allotted bit number n of the block is decided. At the quantizing circuit 44, the data PDI after removal of a minimum value received by way of the delay circuit 49 are converted into a code signal DT by edge-matching quantization using the dynamic range DR' and the allotted bit number n. The quantizing circuit 44 is constituted, for example, from a ROM (read only memory).

The modified dynamic range DR' and average value MIN' are outputted by way of the delay circuits 48 and 50, respectively, and further, the code signal DT and the parameter code Pi indicative of the set of threshold values are outputted. In the present block coding circuit 8, since a signal non-edge matching quantized once is edge matching quantized newly in accordance with dynamic range information, deterioration in picture image upon dubbing is little.

Subsequently, the channel encoder 11 and channel decoder 15 described above will be described more in detail.

Figure 6:
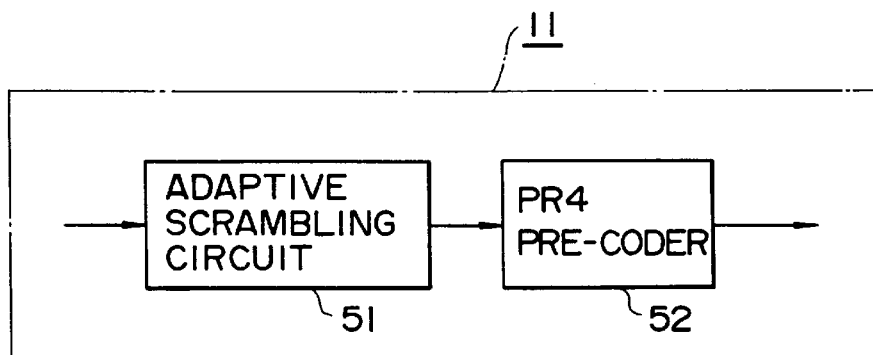
FIG. 6 is a block diagram showing general construction of a channel encoder of the recording circuit shown in FIG. 1.

Referring to FIG. 6, the channel encoder 11 includes a plurality of, M, sequences of scrambling circuits 51 in the form of adaptive scrambling circuits to which an output of the parity generating circuit 10 is supplied. The channel encoder 11 is constructed such that it selects one of the M sequences from which an output wherein high frequency components and dc components are least with respect to the input signal. Calculation of $1/(1-D^2)$ (D is a unit delaying circuit) is performed at a pre-coder 52 for the partial response class 4 detecting system connected to each of the adaptive scrambling circuit 51. An output of the pre-coder 52 is recorded by the magnetic heads 13A and 13B by way of the recording amplifiers 12A and 12B shown in FIG. 1. Reproduction outputs of the magnetic heads 13A and 13B from the thus recorded signals are amplified by the reproduction amplifiers 14A and 14B shown in FIG. 2.

Figure 7:
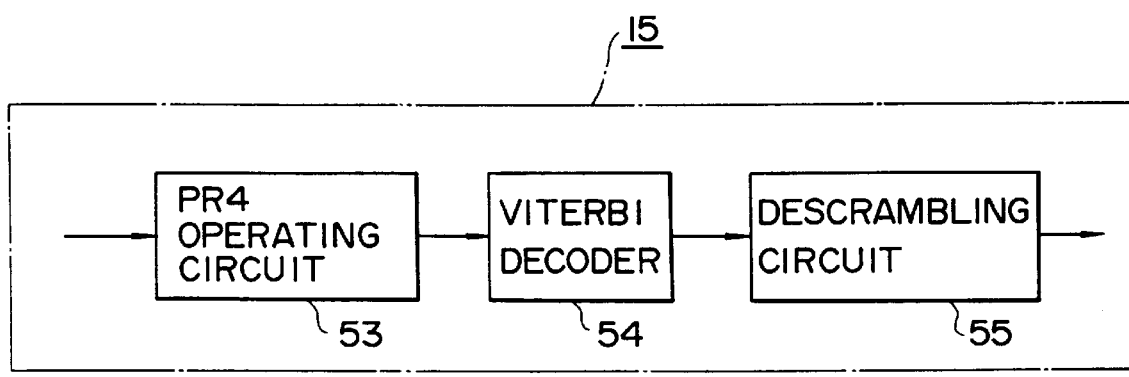
FIG. 7 is a similar view but showing general construction of a channel decoder of the reproducing circuit shown in FIG. 2.

Referring now to FIG. 7, the channel decoder 15 includes a calculating circuit 53 on the reproduction side of the partial response class 4. The calculating circuit 53 performs calculation of 1+D for outputs of the reproduction amplifiers 14A and 14B. Further, at a viterbi decoding circuit 54 connected to the calculating circuit 53, decoding of data tough against noise is performed by calculation for an output of the calculating processing circuit 53 using a correlation, a probability or the like of data. An output of the viterbi decoding circuit 54 is supplied to a descrambling circuit 55, at which data re-arranged by scrambling processing performed by the recording circuit are returned into an original sequence to restore original data. By the viterbi decoding circuit 54 employed in the present channel decoder 15, reproduction C/N conversion is 3 dB and improvement is obtained comparing with another case wherein decoding is performed for each bit.

Figure 8:
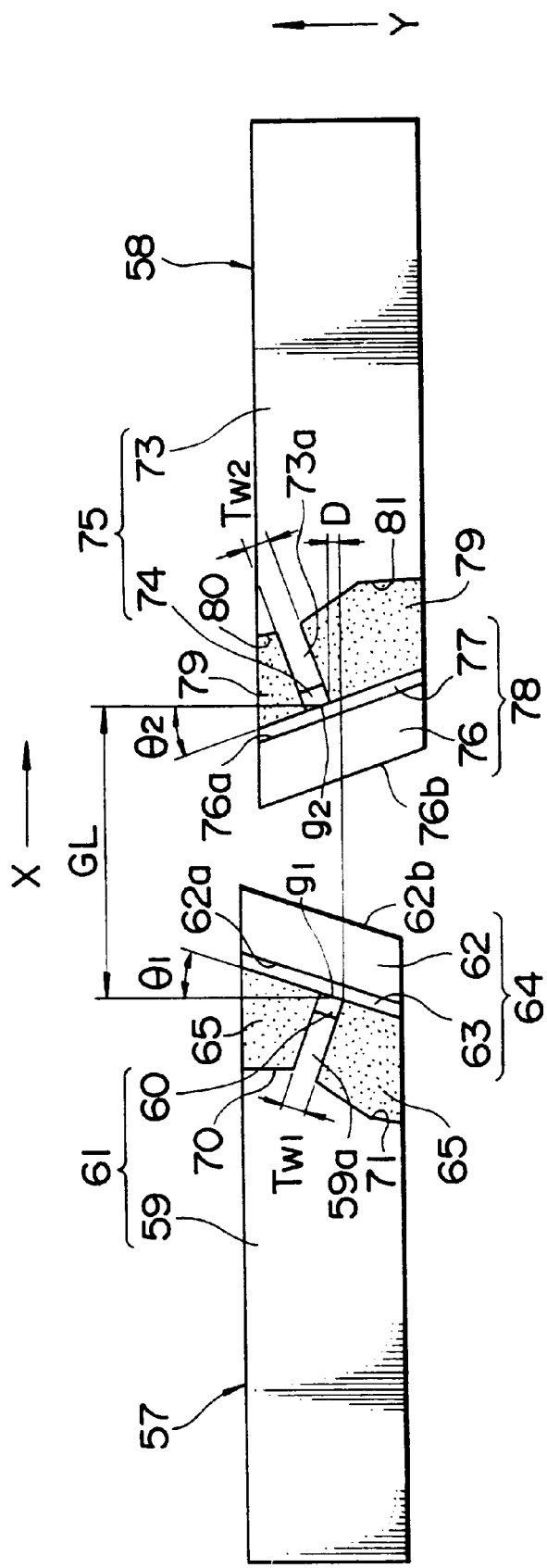
FIG. 8 is a schematic front elevational view of a composite magnetic head to which the present invention is applied as viewed from a tape contacting face side of the magnetic head.
Figure 9:
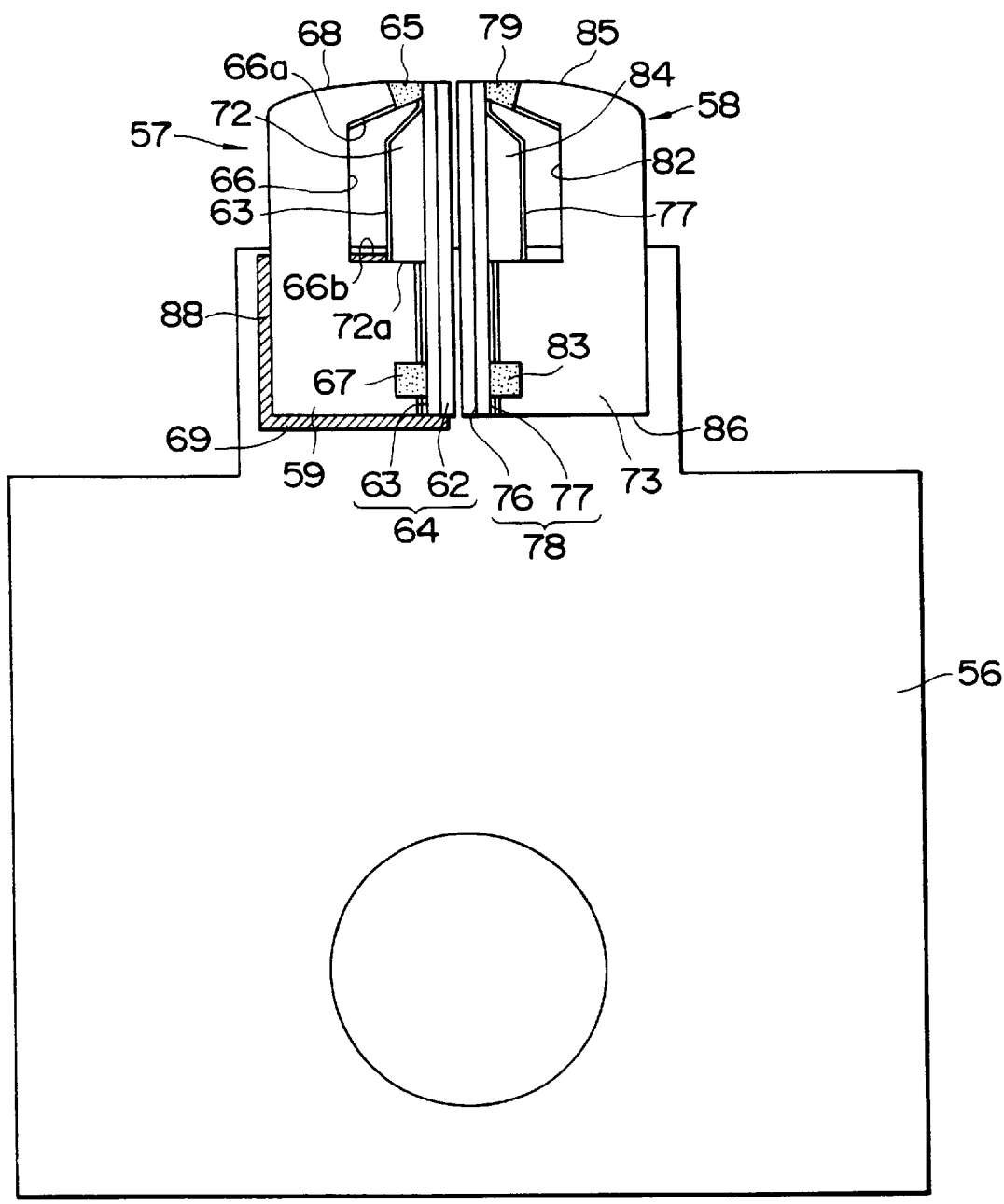
FIG. 9 is a side elevational view, partly in section, of the composite magnetic head shown in FIG. 8.

Referring now to FIGS. 8 and 9, there is shown a composite magnetic head to which the present invention is applied and which is employed to record or reproduce data channel-decoded by such signal processing circuit as described above onto or from a magnetic tape. The composite magnetic head shown is generally constituted such that it can record and/or reproduce a digital picture image signal for a long period of time in a high recording density of 1.25 $\mu m^2$/bit in a short wavelength of 0.5 $\mu$m with a track width of 10 $\mu$m or less onto or from a magnetic tape of a small width equal to or less than the width of 8 $\mu$m at a low bit error rate by means of a pair of magnetic heads having magnetic gaps having different azimuth angles from each other.

In particular, in order to allow a digital picture image signal to be recorded and/or reproduced for a long period of time onto and/or from a magnetic tape of a small width of 8 mm or less, a pair of magnetic heads 57 and 58 are carried in a predetermined positional relationship on a common head base 56 such that recording and reproduction of the magnetic tape may be performed simultaneously by the magnetic heads 57 and 58. It is to be noted that the magnetic heads 57 and 58 correspond to the magnetic heads 13A and 13B described hereinabove with reference to FIGS. 1 and 2.

Description is first given of the magnetic head 57. The magnetic head 57 includes a first magnetic core half 61 and a second magnetic core half 64. The first magnetic core half 61 includes a magnetic core portion 59 made of a ferromagnetic oxide material, and a ferromagnetic thin metal film 60 formed on the magnetic core portion 59 using a vacuum thin film forming technique. Meanwhile, the second magnetic core half 64 similarly includes a magnetic core portion 62 made of a ferromagnetic oxide material, and a ferromagnetic thin metal film 63. The first and second magnetic core halves 61 and 64 are integrally joined to each other by means of fusion joining glass 65 at a butting face s thereof provided by the ferromagnetic thin metal films 60 and 63.

The magnetic core portion 59 constituting the first magnetic core half 61 is made of a ferromagnetic oxide material such as, for example, Mn—Zn ferrite or Ni—Zn ferrite, and has, at an opposing face thereof to the ferromagnetic thin metal film 60, a coil winding groove 66 of a rectangular section for winding therein a coil (not shown) for supplying a recording signal or taking out a reproduction signal from a magnetic tape. Further, a glass groove 67 is formed on the opposing face of the magnetic core section 59 to the ferromagnetic thin metal film 60, and the fusion joining glass 65 is filled in the glass groove 67 in order to make the joining between the first and second magnetic core halves 61 and 64 surer. The coil winding groove 66 is provided in the proximity of a magnetic record medium contacting face 68 of the magnetic core portion 59 which serves as a contacting face with a magnetic tape. The depth of a magnetic gap $g_1$ of the magnetic head 57 is restricted by an inclined face 66a of the coil winding groove 66 adjacent the magnetic record medium contacting face 68. Meanwhile, the glass groove 67 is provided in the proximity of a face of the magnetic core portion 59 remote from the magnetic record medium contacting face 68 and has a shape of a concave shallow groove in side elevation.

The opposing portion of the magnetic core portion 59 to the ferromagnetic thin metal film 60 is formed such that it is cut away at the opposite sides thereof in a chip widthwise direction and a substantially central portion remains long and slender along a sliding direction of a magnetic tape. A pair of cutaway portions 70 and 71 at which the opposing portion of the magnetic core portion 59 is cut away serve as track width restricting grooves for restricting a track width $Tw_1$ of the magnetic gap $g_1$ of the magnetic head 57. Accordingly, an elongated core portion 59a defined by the cutaway portions 70 and 71 has a same width as the track width $Tw_1$ of the magnetic gap $g_1$. The elongated core portion 59a will be hereinafter referred to as thin metal film forming portion. It is to be noted that the thin metal film forming portion 59a is inclined with a same angle as an azimuth angle $\theta_1$ of the magnetic gap $g_1$ with respect to the sliding direction of a magnetic tape.

The ferromagnetic thin metal film 60 is formed such that it extends intermittently from the magnetic record medium contacting face 68 side to the opposite face 69 along an opposing face of the thin metal film forming portion 59a to the ferromagnetic thin metal film 60. In particular, the ferromagnetic thin metal film 60 is formed over the entire opposing face of the thin metal film forming portion 59a except those portions within the coil winding groove 66, the inclined face 66a and within the glass groove 67. A ferromagnetic material having a high saturation flux density and superior in soft magnetic characteristic is employed for the ferromagnetic thin metal film 60.

As such ferromagnetic material, any of ferromagnetic metal materials such as Fe—Al—Si alloys, Fe—Al alloys, Fe—Si—Co alloys, Fe—Ni alloys, Fe—Al—Ge alloys, Fe—Ga—Ge alloys, Fe—Si—Ge alloys, Fe—Co—Si—Al alloys or Fe—Ga—Si alloys may be employed, or in order to achieve further improvement in corrosion resistance or abrasion resistance of the Fe—Ga—Si alloys listed above, any of alloys which include Fe, Ga, Co (including those wherein part of Fe is replaced by Co) or Si as a basic component and to which at least one of Ti, Cr, Mn, Zr, Nb, Mo, Ta, W, Ru, Os, Rh, Ir, Re, Ni, Pb, Pt, Hf and V is added may be employed.

Alternatively, any of ferromagnetic amorphous alloys such as, for example, metal-metalloid amorphous alloys such as alloys consisting of one or more of Fe, Ni and Co and one or more of P, C, B and Si or alloys which include any of such alloys as a principal component and contain Al, Ge, Be, Sn, In, Mo, W, Ti, Mn, Cr, Zr, H, Nb or the like, or metal-metal amorphous alloys which include a transition element such as Co, Hf or Zr, a rare earth element or the like as a principal component may be employed.

Among such ferromagnetic materials as listed above, particularly that one which presents a saturation flux density higher than 14 kG is employed preferably because it makes a high recording density of 1.25 $\mu m^2$/bit or more available, and for example, an Fe—Ga—Si—Ru alloy having a saturation flux density of 14.5 kG is preferable. If a ferromagnetic material having such a high saturation flux density is employed, then recording can be performed onto a magnetic tape of a high coercive force without causing magnetic saturation.

Meanwhile, a vacuum thin film forming technique such as, for example, a vapor depositing method, a sputtering method or an ion plating method can be employed as a film applying technique for any of the ferromagnetic materials listed above.

Meanwhile, the magnetic core portion 62 which constitutes the second magnetic core half 64 is made of a ferromagnetic oxide material such as Mn—Zn ferrite or Ni—Zn ferrite or the like similarly to the magnetic core portion 59 described above. The magnetic core portion 62 is formed as a bar-shaped core which has a small thickness in the head feeding direction indicated by X in FIG. 8 and has a sectional shape substantially of a parallelogram. An auxiliary core portion 72 is provided at a portion of the magnetic core portion 62 corresponding to the coil winding groove 66 formed on the magnetic core portion 59 constituting the first magnetic core half 61 such that it increases the sectional area of the magnetic core portion 62. In particular, the auxiliary portion 72 is formed as a projection having a rectangular section conforming to the shape of the coil winding groove 66 and is provided such that it is magnetically joined to and integrated with the opposing face 62a of the core portion 62 in such a manner as to project into the coil winding groove 66. Accordingly, the sectional area of the magnetic core portion 62 is increased by that of the auxiliary core portion 62. It is to be noted that a side face 62b of the magnetic core portion 62 on the opposite side of the face on which the ferromagnetic thin metal film 63 is formed is inclined obliquely with respect to a direction perpendicular to the sliding direction of a magnetic tape.

The ferromagnetic thin metal film 63 is formed along the opposing face 62a of the magnetic core portion 62 and extends from the magnetic record medium contacting face 68 side to the opposite face 69 remote from the magnetic record medium contacting face 68. In particular, the ferromagnetic thin metal film 63 is formed to extend over the entire opposing face 62a of the magnetic core portion 62 except an opposing face 72a of the auxiliary core portion 72 to a bottom face 66b of the coil winding groove 66.

The first and second magnetic core halves 61 and 64 constructed in such a manner as described above are abutted with each other at abutting faces thereof provided by the ferromagnetic thin metal films 60 and 63 and are integrally joined to each other as the fusion joining glass 65 is filled in the spacing formed between the ferromagnetic thin metal film 63 and the cutaway portions 70 and 71. The first and second magnetic core halves 61 and 64 define the magnetic gap $g_1$ having the track width $Tw_1$ at an interface between the ferromagnetic thin metal films 60 and 63 with a gap film interposed between the ferromagnetic thin metal films 60 and 63. The magnetic gap $g_1$ here is provided with the predetermined azimuth angle $\theta_1$ in the clockwise direction with respect to a track pitch direction indicated by an arrow mark Y in FIG. 8.

The azimuth angle $\theta_1$ here is preferably equal to or greater than 10 degrees in order to reduce crosstalk from the magnetic gap $g_2$ of the other magnetic head 58 provided on the common head base 56. A composite magnetic head which was actually produced in accordance with the present invention, and in the composite magnetic head, the azimuth angle $\theta_1$ of the magnetic gap $g_1$ was set to 20 degrees. Meanwhile, the track width $Tw_1$ of the magnetic gap $g_1$ is preferably set greater by +0 $\mu$m to +3 $\mu$m than the track pitch P on a magnetic tape because, in the case of ATF (automatic tracking), recording or reproduction is performed while picking up a signal of an adjacent track. It is to be noted that, if the track width $Tw_1$ of the magnetic gap $g_1$ is excessively great, then neighboring crosstalk upon reproduction is high, and therefore, the range described above is most preferable. Particularly, since the track pitch P is set equal to or smaller than 10 $\mu$m, the track width $Tw_1$ of the magnetic gap $g_1$ is 10 $\mu$m to 13 $\mu$m. In the actually produced composite magnetic head described above, the track width $Tw_1$ was set to 7 $\mu$m in order to make the track pitch P on a magnetic tape equal to 5 $\mu$m.

The other magnetic head 58 has a similar construction and includes a third magnetic core half 75 and a fourth magnetic core half 78. The third magnetic core half 75 includes a magnetic core portion 73 made of a ferromagnetic oxide material and a ferromagnetic thin metal film 74 formed on the magnetic core portion 73. Meanwhile, the fourth magnetic core half 78 similarly includes a magnetic core portion 76 made of a ferromagnetic oxide material and a ferromagnetic thin metal film 77. The third and fourth magnetic core halves 75 and 78 are integrally joined to each other at abutting faces thereof provided by the ferromagnetic thin metal films 74 and 77 by fusion joining glass 79.

Also in the magnetic head 58, an opposing portion of the magnetic core portion 73 to the ferromagnetic thin metal film 74 is formed, similarly as in the magnetic head 57 described hereinabove, such that it is cut away at the opposite sides thereof in a chip widthwise direction and a substantially central portion remains long and slender along a sliding direction of a magnetic tape. A pair of cutaway portions 80 and 81 at which the opposing portion of the magnetic core portion 73 is cut away serve as track width restricting grooves for restricting a track width $Tw_2$ of the magnetic gap $g_2$ of the magnetic head 58. Accordingly, an elongated core portion 73a defined by the cutaway portions 80 and 81 has a same width as the track width $Tw_2$ of the magnetic gap $g_2$. The elongated core portion 73a will be hereinafter referred to as thin metal film forming portion. It is to be noted that the th in metal film forming portion 73a is inclined at a same angle as an azimuth angle $\theta_2$ of the magnetic gap $g_2$ with respect to the sliding direction of a magnetic tape but in the opposite direction to that of the thin metal film forming portion 59a described hereinabove.

Also in the magnetic head 58, a coil winding groove 82 and a glass groove 83 are formed on an opposing face of the magnetic core portion 73 opposing to the ferromagnetic thin metal film 74. An auxiliary core portion 84 in the form of a projection having a rectangular portion for increasing the sectional area of the magnetic core portion 76 is provided at a portion of the other magnetic core portion 76 corresponding to the coil winding groove 82. It is to be noted that a side face 76b of the other magnetic core portion 76, on which the auxiliary core portion 84 is provided, remote from the ferromagnetic thin metal film 77 is inclined in the opposite direction to that of the magnetic core portion 62 of the magnetic head 57 described hereinabove.

Also the ferromagnetic thin metal films 74 and 77 are formed by a vacuum thin film forming technique by applying a ferromagnetic material and extend from the magnetic record medium contacting face 85 side of the magnetic core portion 73 to another face 86 of the magnetic core portion 73 remote from the magnetic record medium contacting face 85 along the opposing face of the thin metal film forming portion 73a and the opposing face 76a of the magnetic core portion 76.

In the magnetic head 58, the third and fourth magnetic core halves 75 and 78 are abutted at abutting faces thereof provided by the ferromagnetic thin metal films 74 and 77 and are integrally joined to each other as the fusion joining glass 79 is filled in the spacing defined between the ferromagnetic thin metal film 77 and the cutaway portions 80 and 81. The magnetic gap $g_2$ having the track width $Tw_2$ is defined between the ferromagnetic thin metal films 74 and 77. Here, the magnetic gap $g_2$ has the predetermined azimuth angle $\theta_2$ in the clockwise direction with respect to a direction perpendicular to a sliding direction of a magnetic tape. In short, the azimuth of the magnetic gap $g_2$ here is directed reversely to the direction of the azimuth of the magnetic gap $g_1$ of the magnetic gap 57 described hereinabove. It is to be noted that the azimuth angle $\theta_2$ of the magnetic gap $g_2$ is set to the same angle as the azimuth angle $\theta_1$ of the magnetic gap $g_1$ described hereinabove.

The magnetic heads 57 and 58 constructed in such a manner as described above are securely disposed in a predetermined positional relationship on the common head base 56 such that the inclined opposing faces 62b and 76b thereof are abutted with each other. The magnetic heads 57 and 58 are disposed with an offset D substantially equal to the pitch P of tracks recorded on a magnetic tape 87 shown in FIG. 10 by the magnetic heads 57 and 58 in the track pitch direction indicated by the arrow mark Y in FIG. 8. It is to be noted that the offset D here denotes a distance in the track pitch direction between ends of the magnetic gaps $g_1$ and $g_2$ of the magnetic heads 57 and 58 adjacent the head base 56 in the track widthwise direction.

In particular, the magnetic head 57 is disposed on a spacer 88 having a thickness equal to the offset D and mounted on the head base 56 as shown in FIG. 9. Consequently, the distance in the track widthwise direction between end portions of the magnetic gap $g_1$ of the magnetic head 57 and the magnetic gap $g_2$ of the magnetic head 58 which is mounted directly on the head base 56 is equal to the offset D. Accordingly, the magnetic gap $g_1$ of the magnetic head 57 disposed on the spacer 88 is disposed with the offset D adjacent the head base 56 with respect to the magnetic gap $g_2$ of the magnetic head 58 which is disposed directly on the head base 56.

Here, because the track pitch P on the magnetic tape 87 is equal to or less than 10 $\mu$m, the offset D is set to 10 $\mu$m or less accordingly. In the actually produced composite magnetic head described above, since the track pitch P was 5 $\mu$m, the offset D was equal to 5 $\mu$m. Accordingly, also the thickness of the spacer 88 was similarly 5 $\mu$m.

Further, the magnetic heads 57 and 58 are disposed with an offset GL equal to an offset d between adjacent tracks on the magnetic tape 87 in the head scanning direction indicated by an arrow mark X in FIG. 8. It is to be noted that the offset d between tracks here denotes a distance between ends of adjacent record tracks 89 and 90 in a record area in the head scanning direction. The offset GL denotes a distance between the centers of the track widths $Tw_1$ and $Tw_2$ of the magnetic gaps $g_1$ and $g_2$ of the magnetic heads 57 and 58 in the head scanning direction.

Here, the offset GL is selected so as to assure a record area for a picture image signal and is set, for example, to a value equal to or less than 500 $\mu$m. If the offset GL is greater than 500 $\mu$m, then the picture image signal area is excessively narrow, which is disadvantageous for the reproduction for a long period of time. On the contrary, if the offset GL is excessively small, then the opposing magnetic core portions 62 and 76 are reduced in thickness, and the head efficiency is reduced by a reduction in sectional area of the cores. From such circumstances as described above, in the actually produced composite magnetic head described above, the offset GL was set to 200 $\mu$m. In this manner, even if the magnetic cores 62 and 76 are small in thickness in this manner, since the sectional areas of the magnetic cores 62 and 76 of the magnetic heads 57 and 58 are increased by the auxiliary core portions 72 and 84 which are magnetically joined to and integrated with the magnetic core portions 62 and 76, the head efficiency will not be deteriorated at all.

Figure 10:
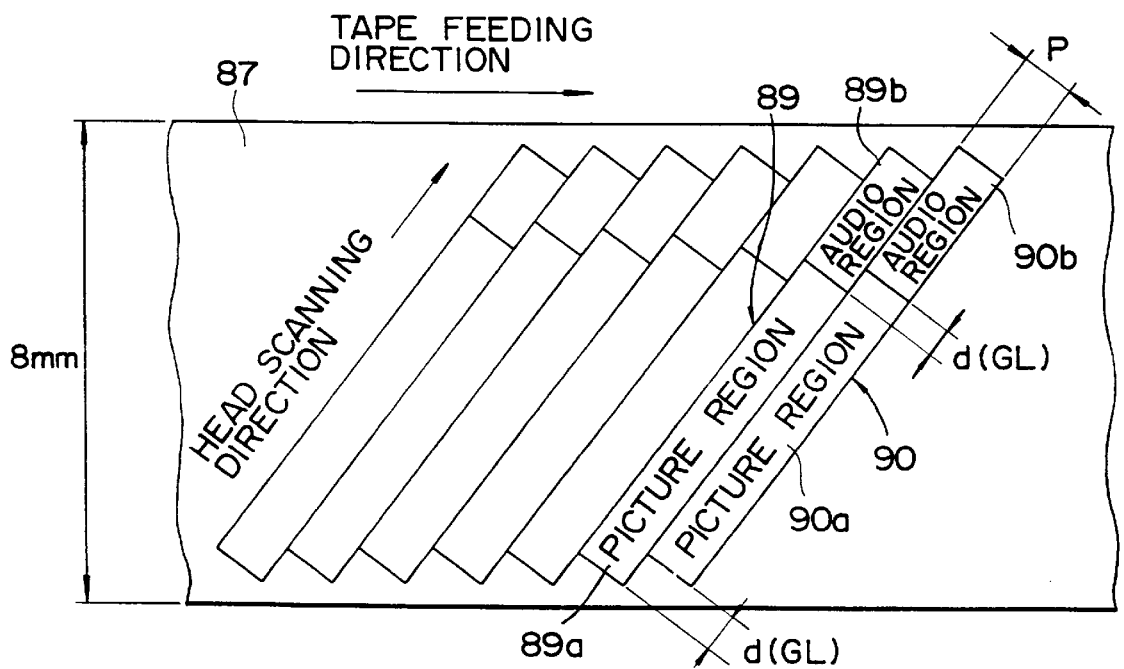
FIG. 10 is a diagrammatic view showing a tape format of a magnetic tape on which digital picture information and an audio signal are recorded by the composite magnetic head shown in FIG. 8.

The composite magnetic head disposed in this manner is mounted on a rotary drum (not shown) together with the head base 56. The rotary drum is rotated to scan so that such a record pattern as shown in FIG. 10 is formed by the magnetic heads 57 and 58 on the magnetic tape 87 which is fed relatively along a circumferential face of the rotary drum. In this instance, the feeding rate of the magnetic tape 87 and the speed of rotation of the magnetic heads 57 and 58 per unit time are decided so that the offset GL between the magnetic heads 57 and 58 in the head scanning direction and the offset d between adjacent tracks on the magnetic tape 87 may be equal to each other.

Referring to FIG. 10, the record tracks 89 and 90 on the magnetic tape 87 are recorded by the magnetic heads 57 and 58 with the offset d equal to the offset GL between the magnetic heads 57 and 58 in pair in the head scanning direction. Accordingly, the magnetic heads 57 and 58 come to ends of picture regions 89a and 90a or audio regions 89b and 90b of the respective record tracks 89 and 90. As a result, after recording wherein an audio signal is recorded later is performed readily without having an influence upon any other signal. Further, since recording and/or reproduction are performed simultaneously by the two magnetic heads 57 and 58 disposed on the common head base 56, even if recording or reproduction is performed at a recording density equal to or higher than 1.25 $\mu m^2$/bit onto the magnetic tape 87 having a tape width equal to or less than 8 mm, recording and/or reproduction of a digital picture image signal for a long period of time can be performed without an increase of the bit error rate arising from abnormal track patterns.

For example, in case two magnetic heads having different azimuth angles from each other are disposed in an angularly spaced relationship by 180 degrees on a rotary head and record and/or reproduce similarly at a recording density equal to or higher than 1.25 $\mu m^2$/bit onto and/or from the magnetic tape 87 of 8 mm wide, an abnormal track pattern wherein a track recorded by a preceding one of the magnetic heads and another track recorded by the other following magnetic head disposed in an angularly spaced relationship by 180 degrees overlap partially with each other is caused by the rotary drum which is mounted in an eccentric condition or the like. Consequently, part of the signal recorded by the preceding magnetic head is erased partially by the signal recorded by the following magnetic head, and a sufficient reproduction output cannot be obtained and the bit error rate will be very high. However, with the composite magnetic head described above, since the two magnetic heads 57 and 58 are disposed on the common head base 56, even if the rotary drum is mounted, for example, in an eccentric condition, the record tracks 89 and 90 recorded by the magnetic heads 57 and 58 will be inclined in the same direction and neither of them will overlap with the other record track. Accordingly, a sufficient reproduction output can be obtained and the bit error rate does not become high.

It is to be noted that, in the actually produced composite magnetic head described above, when a signal of the wavelength of 0.3 $\mu m$ was recorded and/or reproduced at the track pitch of 10 $\mu m$ onto and/or from a magnetic tape of the tape width of 8 mm in a standard mode (SP), the recording time was 3 hours. When such signal was recorded and/or reproduced similarly at another track pitch of 5 $\mu m$ in a double speed mode (LP), the recording time was 6 hours.

The magnetic heads 57 and 58 described above are manufactured in the following manner.

Figure 11:
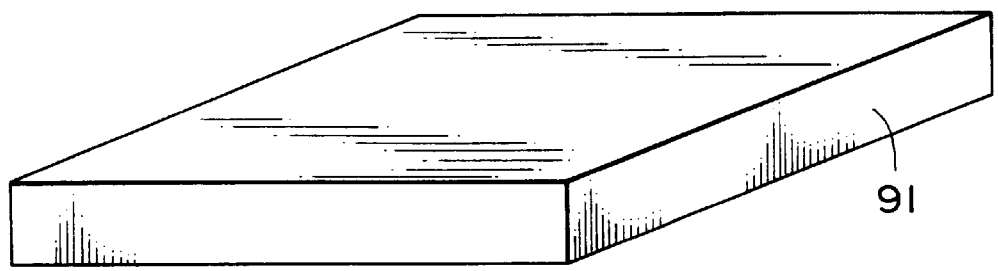

First, a block 91 in the form of a flat plate made of Mn—Zn ferrite is prepared as shown in FIG. 11.

Figure 12:
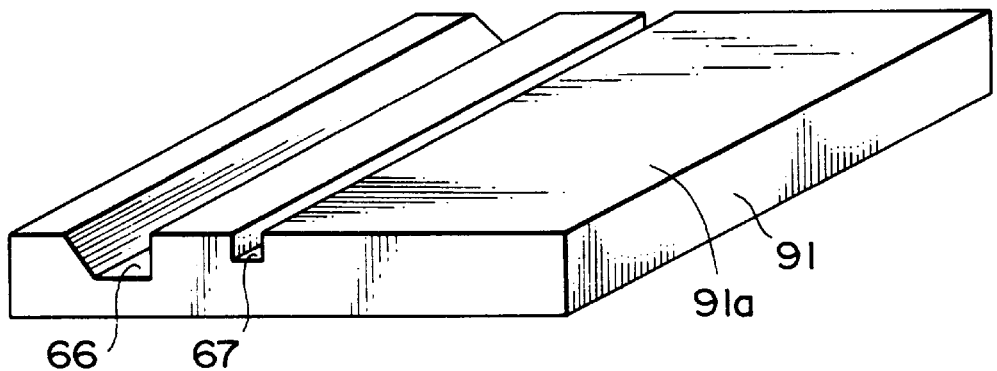

Then, a coil winding groove 66 and a glass groove 67 are formed on a principal surface 91a of the block 91 as shown in FIG. 12.

Subsequently, the block 91 is cut in parallel to the glass groove 67 to divide the block 91 into two blocks 92 and 93.

The block 92 has the coil winding groove 66 and the glass groove 67 thereon while none of them is formed on the other block 93.

Figure 13:
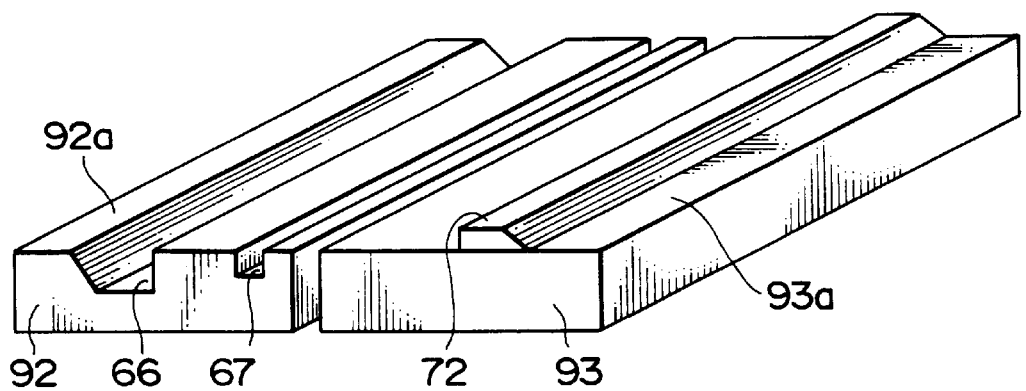

Subsequently, mirror surface working is performed for principal surfaces 92a and 93a of the blocks 92 and 93. After then, an auxiliary core portion 72 made of ferrite and having a rectangular section is joined by gold joining to the principal surface 93a of the block 93 as shown in FIG. 13.

More particularly, a ground layer made of Cr or Ti is first formed on the principal surface 93a of the block 93, and an Au layer is applied to the ground layer. Similarly, a ground layer made of Cr or Ti is formed on a joining face of the auxiliary core portion 72, and an Au layer is laminated on the ground layer. Then, the Au layers are contacted with each other and thermally diffused to integrally join the block 93 and the auxiliary core portion 72 to each other.

Such thermal diffusion joining with Au is effective against deterioration of magnetic characteristics, an influence of distortion arising from thermal expansion, an oxidation diffusing reaction and so forth since it is performed at a very low joining temperature of 150 to 300 degrees. It is particularly advantageous when an amorphous alloy is employed for a ferromagnetic thin metal film, and since the temperature of the thermal diffusion does not exceed a crystallization temperature at all, otherwise possible deterioration in soft magnetic characteristic by crystallization can be prevented. Further, since a layer made of Cr or Ti is provided as a ground layer, a high joining strength is assured.

It is to be noted that the auxiliary core portion 72 is dimensioned at least such that it is accommodated in the coil winding groove 66 and a spacing sufficient to wind a coil therein can be assured, and is provided at a position corresponding to the coil winding groove 66.

Subsequently, a ferromagnetic material is sputtered on the principal surfaces 92a and 93a of the blocks 92 and 93 to form ferromagnetic thin metal films 60 and 63 as shown in FIG. 14.

In this instance, the ferromagnetic thin metal film 60 is prevented from being formed in the coil winding groove 66 except the inclined face 66a and in the glass groove 67 both formed on the block 92. Meanwhile, the ferromagnetic thin metal film 63 is prevented from being formed on a face 72a of the auxiliary core portion 72 which is provided on the other block 93 and extends perpendicularly to the principal surface 93a of the block 93.

Subsequently, cutaway portions 70 and 71 to make track width restricting grooves are formed on the principal surface 92a of the block 92 such that they extend perpendicularly to the coil winding groove 66 and the glass groove 67 as shown in FIG. 15.

In this instance, the cutaway portions 70 and 71 are formed such that they extend to the inclined face 66a of the coil winding groove 66. Besides, the cutaway portions 70 and 71 are formed by a number corresponding to a number of heads to be produced from the single block 92 and at a predetermined distance along the longitudinal direction of the block 92.

As a result, elongated thin metal film forming portions 59a having ferromagnetic thin metal films 60 at ends thereof are formed between the cutaway portions 70 and 71. The thickness of the thin metal film forming portions 59a then is equal to the track width $Tw_1$ of the magnetic gap $g_1$.

Figure 16:
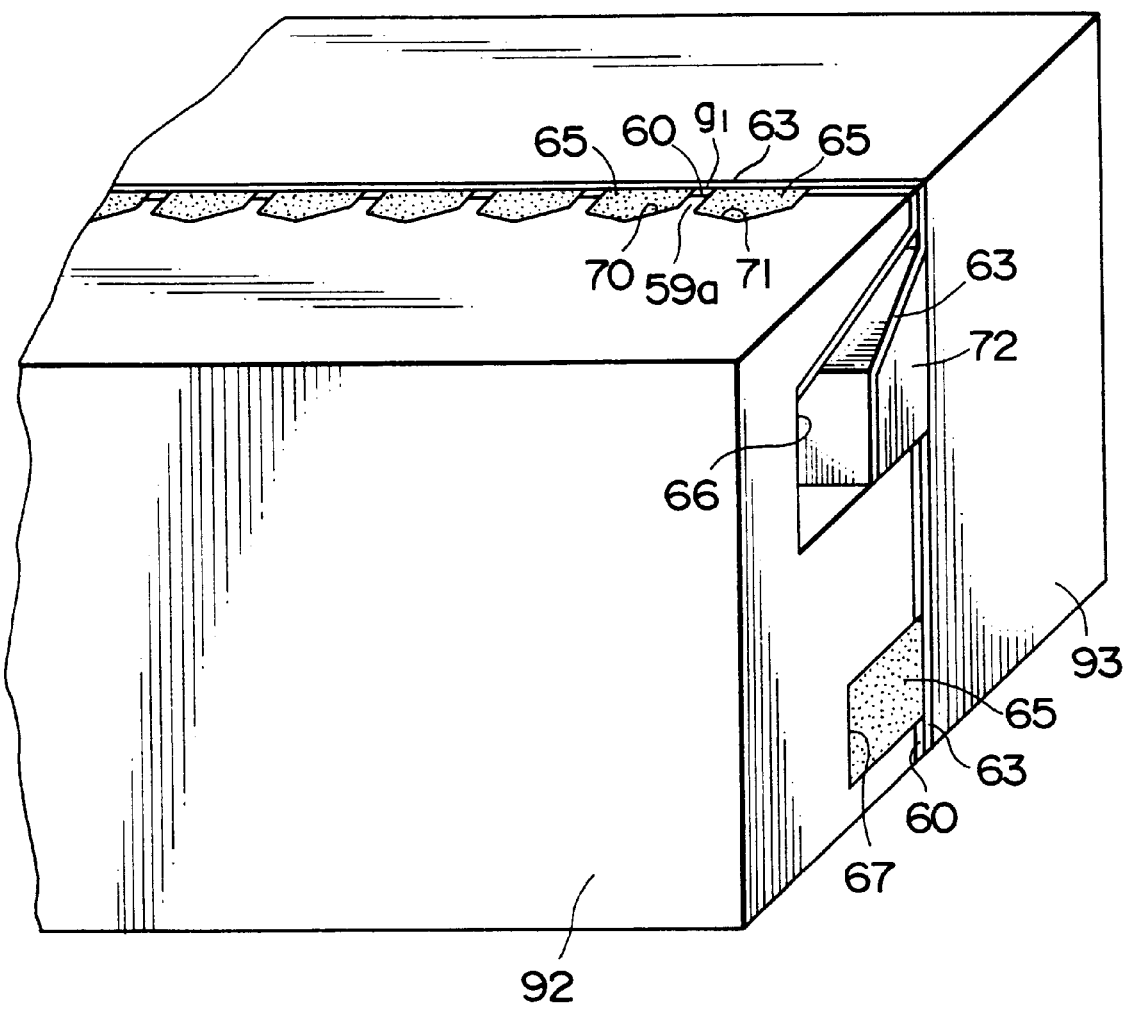
Figure 17:
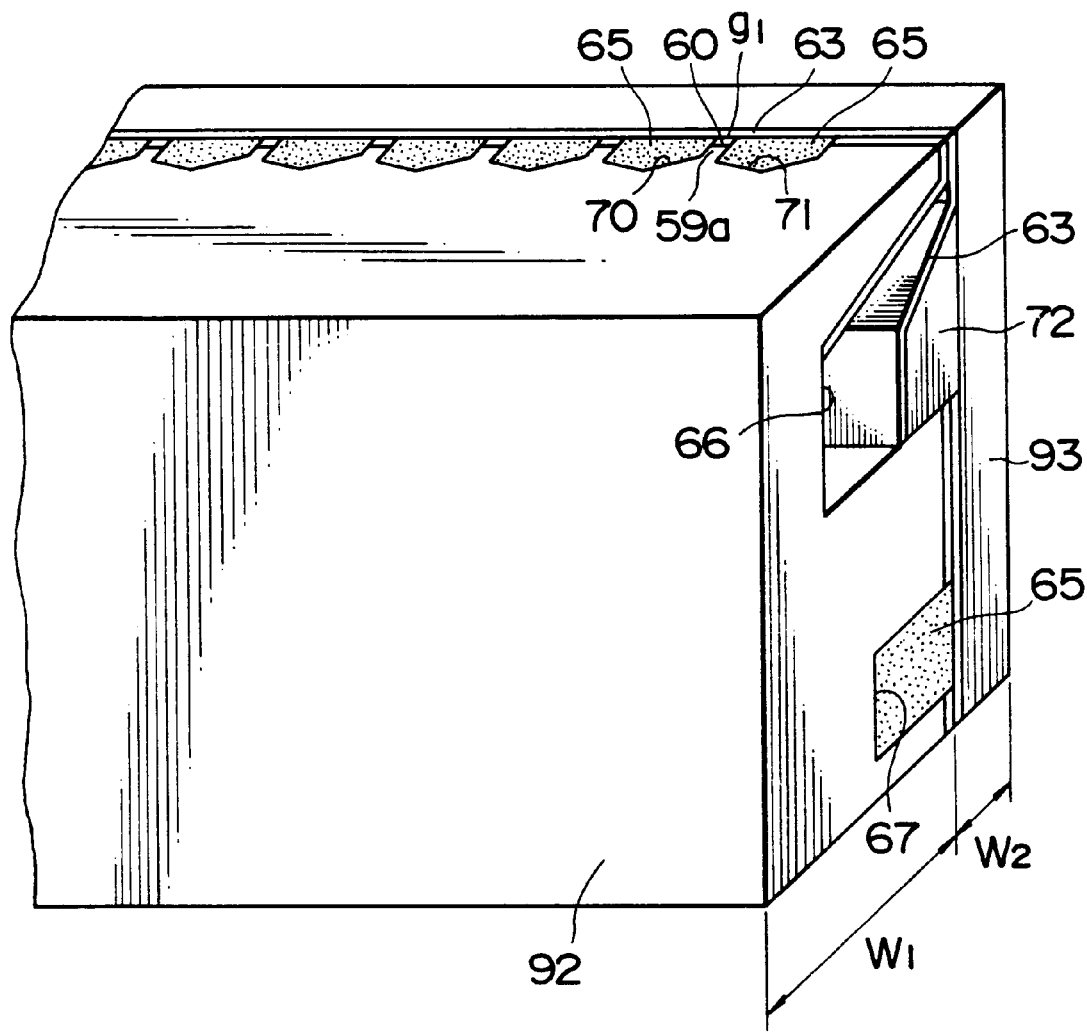

Subsequently, the blocks 92 and 93 are abutted with each other at abutting faces thereof provided by the ferromagnetic thin metal films 60 and 63 as shown in FIG. 16 with a gap film of a predetermined thickness interposed therebetween. Then, fusion joining glass 65 is filled into the glass groove 67 and a spacing defined between the ferromagnetic thin metal film 63 and the cutaway portions 70 and 71 formed on the blocks 92 and 93, respectively.

As a result, the blocks 92 and 93 are integrally joined to each other with the auxiliary core portion 72 received in the coil winding groove 67. Further, a magnetic gap $g_1$ is defined between the ferromagnetic thin metal films 60 and 63.

Subsequently, faces of the thus joined and integrated blocks 92 and 93 opposite to or remote from the joining faces are polished flat until the width $W_1$ of the block 92 on which the coil winding groove 66 is formed becomes equal to 750 μm and the width $W_2$ of the other block 93 becomes equal to 50 μm.

Then, the steps described above are successively repeated to produce joining blocks 94 and 95 similar to the thus integrally joined blocks 92 and 93.

Figure 18:
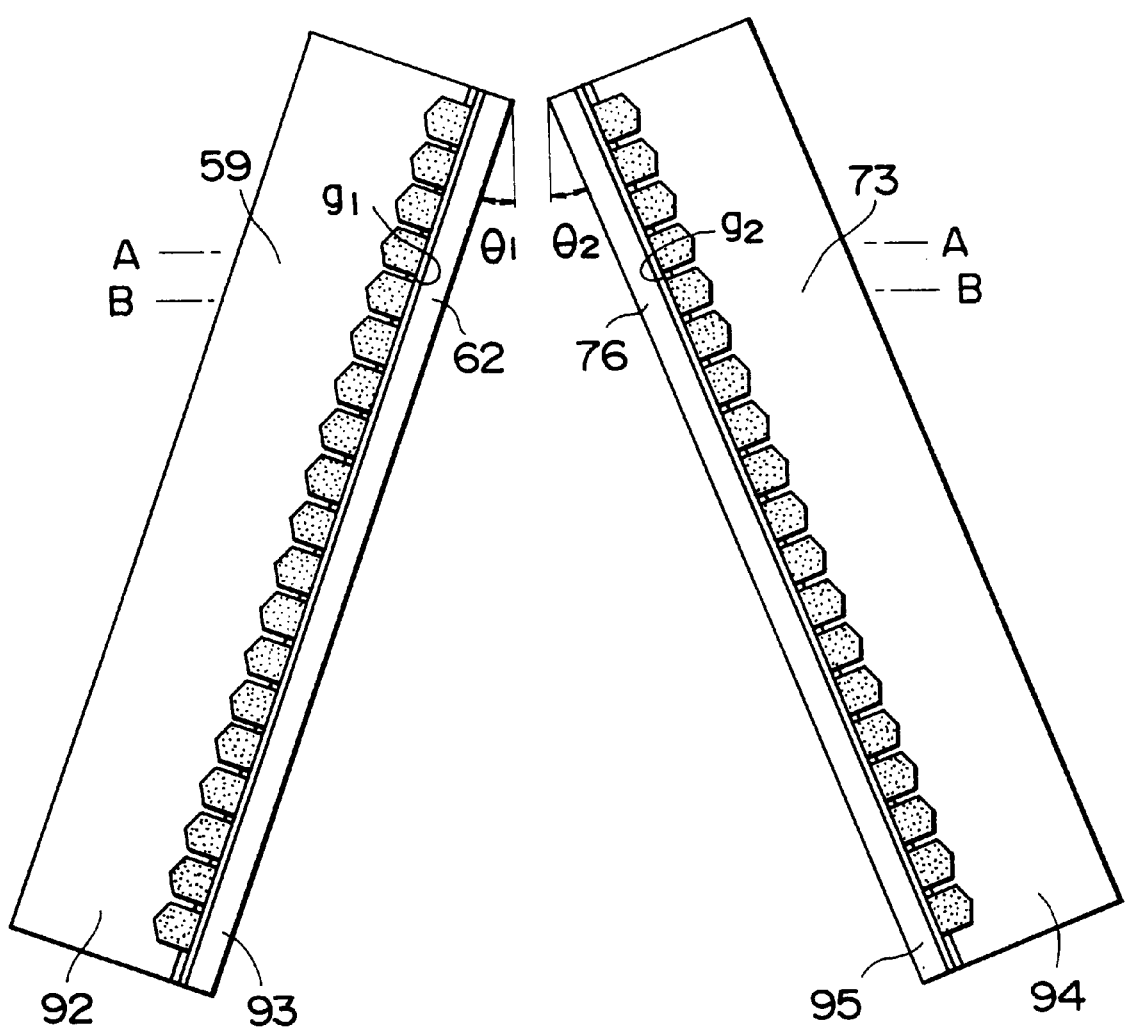

Subsequently, the thus integrally joined blocks 92, 93 and 94, 95 are disposed in an opposing relationship like the opposite sides of a trapezoid such that they are inclined in the opposite directions to each other with the gap positions registered with each other as shown in FIG. 18. The angles $\theta_1$ and $\theta_2$ defined between a vertical line and the opposing faces of the integrally joined blocks 92, 93 and 94, 95 then are made equal to 20 degrees in accordance with the azimuth angles of the magnetic gaps $g_1$ and $g_2$.

Subsequently, the blocks 92, 93 and 94, 95 are secured in this condition and are cut at positions indicated by lines A—A and B—B in FIG. 18 so that the chip thickness may be equal to 0.2 mm.

As a result, a pair of magnetic heads 57 and 58 having the azimuth angles $\theta_1$ and $\theta_2$ different from each other as shown in FIGS. 8 and 9 and described above are obtained from the integrally joined blocks 92, 93 and 94, 95.

Then, the composite magnetic head of the present embodiment is obtained by disposing the magnetic heads 57 and 58 on the common head base 56 on the conditions described hereinabove.

Figure 19:
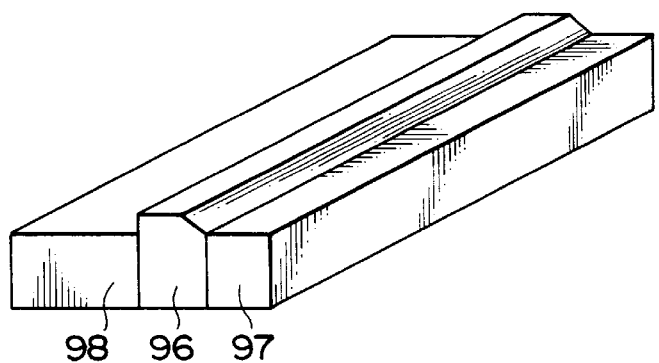
FIG. 19 is a perspective view showing a block divided into three parts one of which serves as an auxiliary core portion.

It is to be noted that, while in the process described above the auxiliary core portion 72 is integrally joined to the block 93 by gold joining, the auxiliary core portion 72 may be formed integrally with the block 93, for example, by machining out it from the block 93. Or else, a first block 96 on which an auxiliary core portion 92 is provided, a second block 97 which is to form a front core and a third block 98 which is to form a back core may be formed separately from and integrally joined to one another as shown in FIG. 19.

Figure 20:
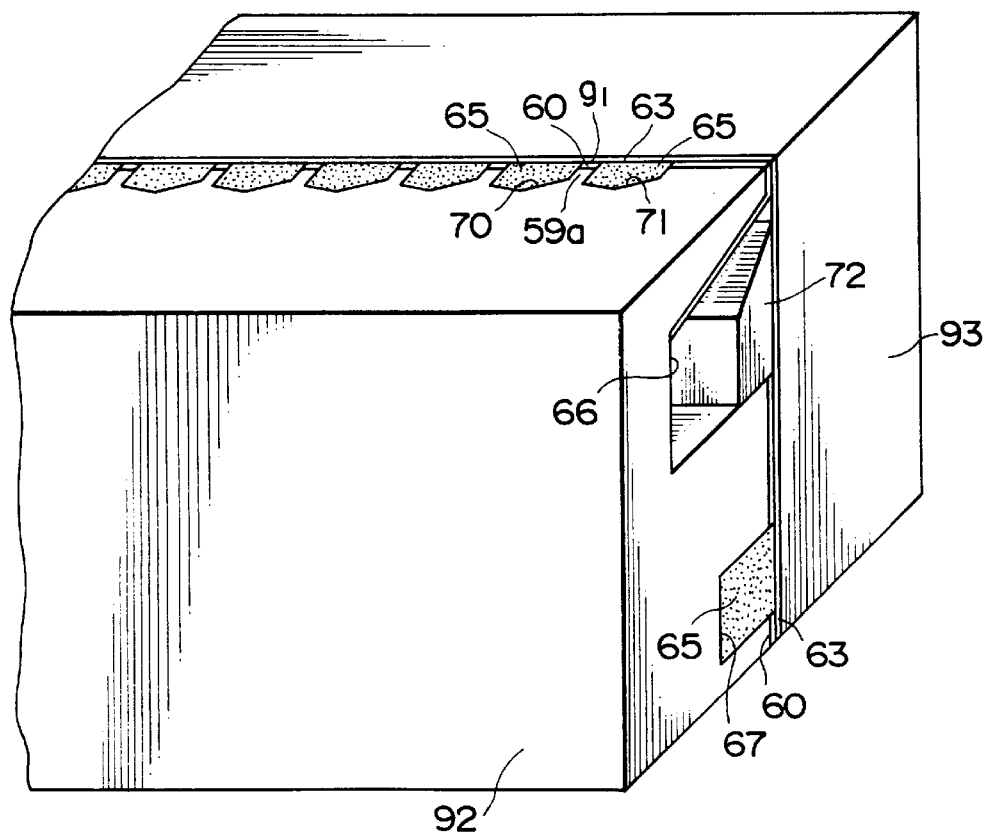
FIG. 20 is a perspective view illustrating alternative formation of an auxiliary core portion after formation of a ferromagnetic thin metal film.

On the other hand, the auxiliary core portion 72 described above may be joined by gold joining or the like to the ferromagnetic thin metal film 63 after such ferromagnetic thin metal film 63 is formed on the block 93 as shown in FIG. 20.

Figure 21:
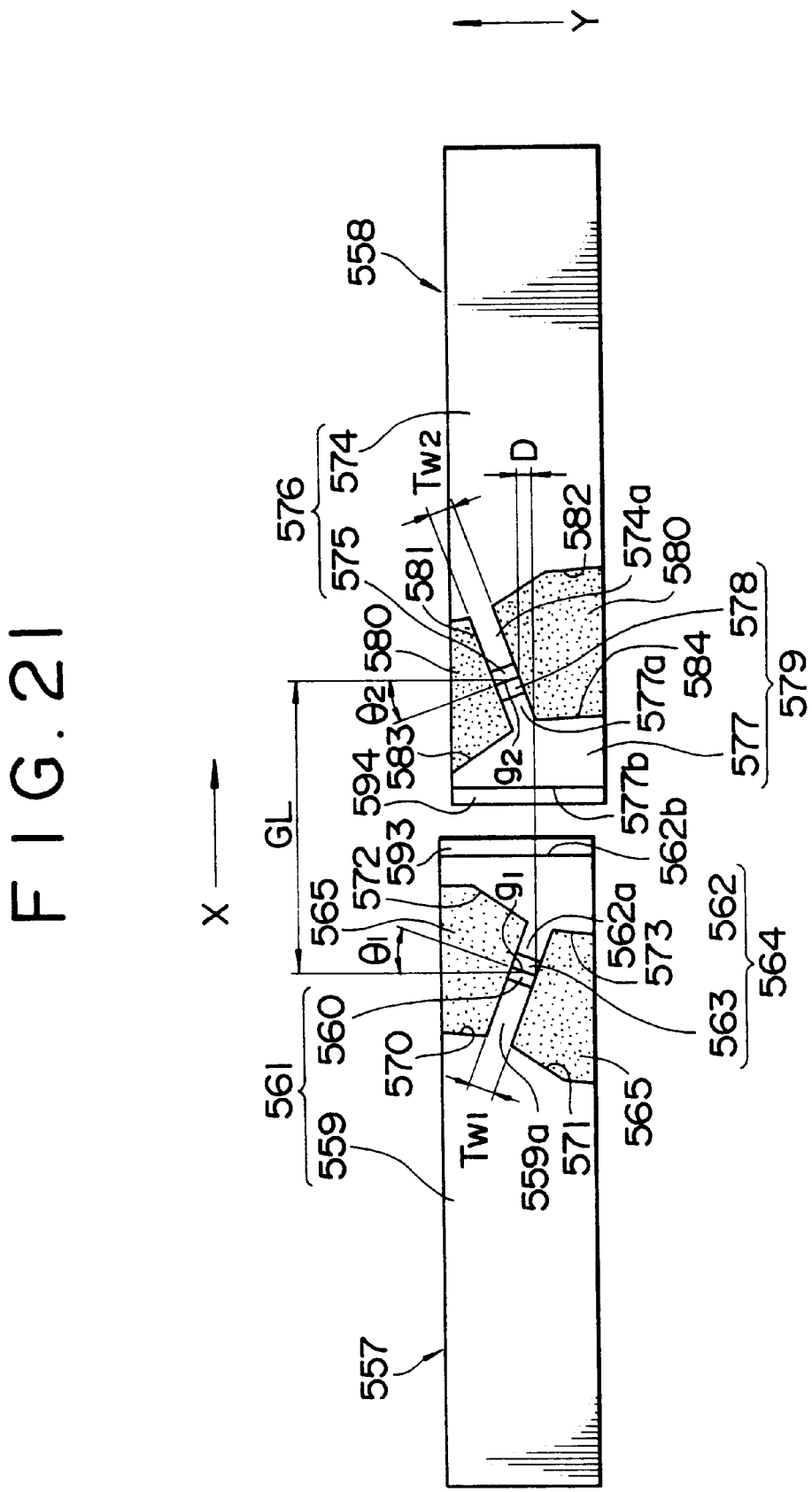
FIG. 21 is a schematic front elevational view of another composite magnetic head to which the present invention is applied as viewed from a tape contacting face side of the magnetic head.
Figure 22:
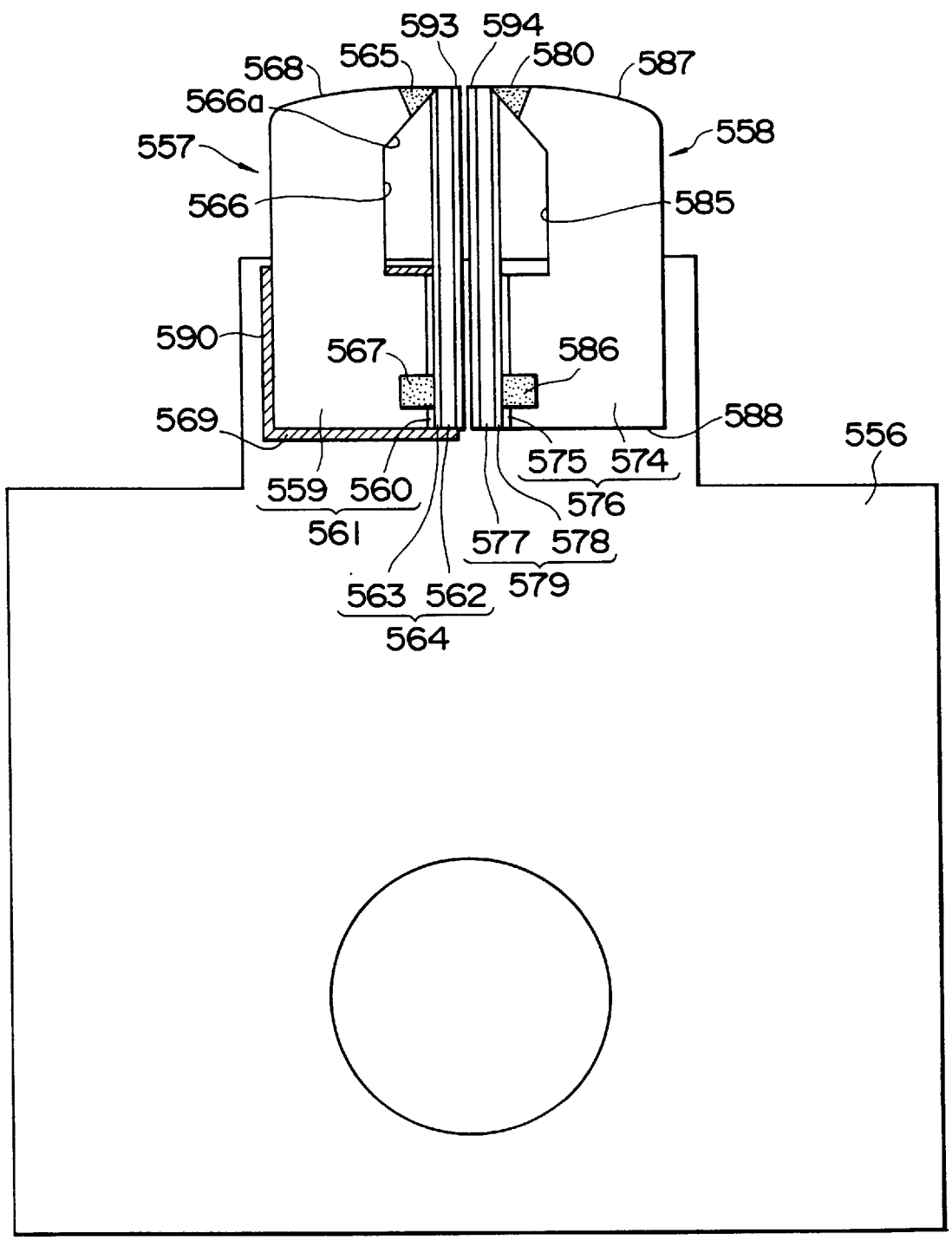
FIG. 22 is a side elevational view, partly in section, of the composite magnetic head shown in FIG. 21.
Figure 24:
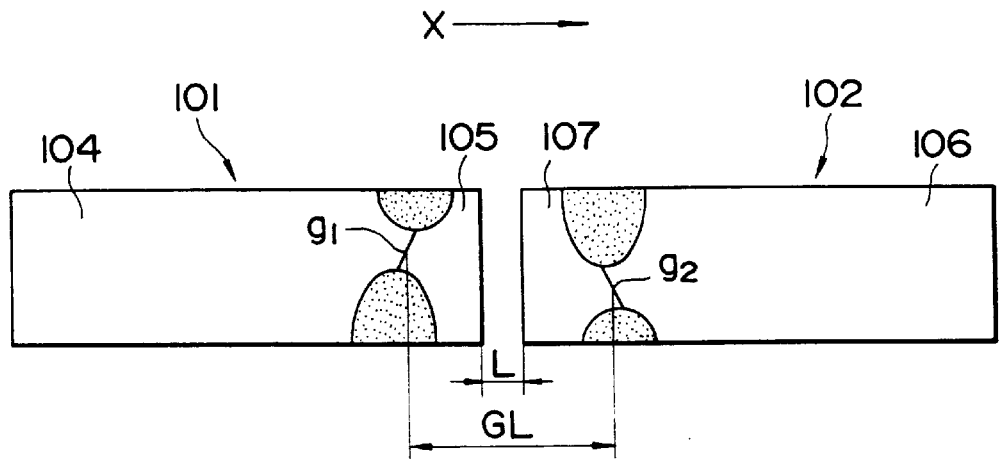
FIG. 24 is a schematic front elevational view of a conventional composite magnetic head as viewed from a tape contacting face side of the same.
Figure 25:
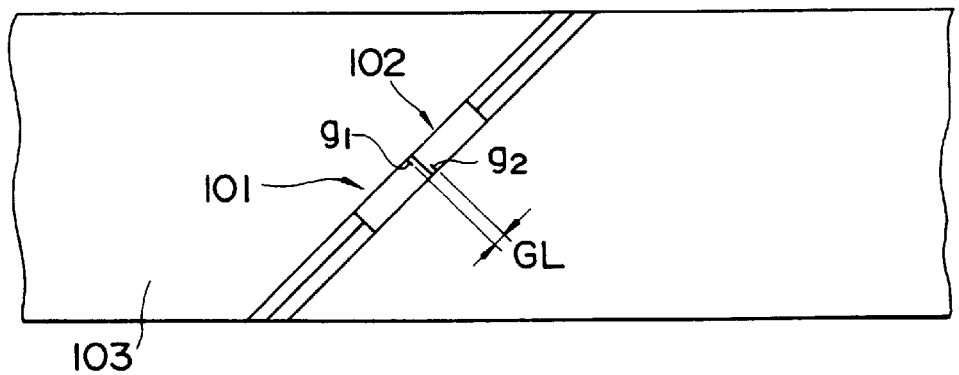
FIG. 25 is a diagrammatic view illustrating recording and/or reproduction of a magnetic tape by the conventional composite magnetic head of FIG. 24.

Referring now to FIGS. 21 and 22, there is shown another composite magnetic head to which the present invention is applied. The composite magnetic head of the present embodiment is generally constructed such that a pair of magnetic heads 557 and 558 having magnetic gaps $g_1$ and $g_2$ having different azimuth angles $\theta_1$ and $\theta_2$ from each other are disposed closely in an opposing relationship to each other on a common head base 556 and record onto and reproduce from a magnetic tape. It is to be noted that the magnetic heads 557 and 558 correspond to the magnetic heads 13A and 13B shown in FIGS. 1 and 2 and described hereinabove, respectively.

Description is first given of the magnetic head 557. The magnetic head 557 includes a first magnetic core half 561 and a second magnetic core half 564. The first magnetic core half 561 includes a magnetic core portion 559 made of a ferromagnetic oxide material, and a ferromagnetic thin metal film 560 formed on the magnetic core portion 559 using a vacuum thin film forming technique. Meanwhile, the second magnetic core half 564 similarly includes a magnetic core portion 562 made of a ferromagnetic oxide material, and a ferromagnetic thin metal film 563. The first and second magnetic core halves 561 and 564 are integrally joined to each other by means of fusion joining glass 565 at abutting faces thereof provided by the ferromagnetic thin metal films 560 and 563.

The magnetic core portion 559 constituting the first magnetic core half 561 is made of a ferromagnetic oxide material such as, for example, Mn—Zn ferrite or Ni—Zn ferrite, and has, at an opposing face thereof to the ferromagnetic thin metal film 560, a coil winding groove 566 for winding therein a coil (not shown) for supplying a recording signal or taking out a reproduction signal from a magnetic tape. Further, a glass groove 567 is formed on the opposing face of the magnetic core section 559 to the ferromagnetic thin metal film 560, and the fusion joining glass 565 is filled in the glass groove 567 in order to make the joining between the first and second magnetic core halves 561 and 564 surer. The coil winding groove 566 is provided in the proximity of a magnetic record medium contacting face 568 of the magnetic core portion 559 which serves as a contacting face with a magnetic tape. The depth of a magnetic gap $g_1$ of the magnetic head 557 is restricted by an inclined face 566a of the coil winding groove 566 adjacent the magnetic record medium contacting face 568. Meanwhile, the glass groove 567 is provided in the proximity of a face of the magnetic core portion 559 remote from the magnetic record medium contacting face 568 and has a shape of a concave shallow groove in side elevation.

The opposing portion of the magnetic core portion 559 to the ferromagnetic thin metal film 560 is formed such that it is cut away at the opposite sides thereof in a chip widthwise direction and a substantially central portion remains long and slender along a sliding direction of a magnetic tape. A pair of cutaway portions 570 and 571 at which the opposing portion of the magnetic core portion 559 is cut away serve as track width restricting grooves for restricting a track width $Tw_1$ of the magnetic gap $g_1$ of the magnetic head 557. Accordingly, an elongated core portion 559a defined by the cutaway portions 570 and 571 has a same width as the track width $Tw_1$ of the magnetic gap $g_1$. The elongated core portion 559a will be hereinafter referred to as thin metal film forming portion. It is to be noted that the thin metal film forming portion 559a is inclined with a same angle as an azimuth angle $\theta_1$ of the magnetic gap $g_1$ with respect to the sliding direction of a magnetic tape.

The ferromagnetic thin metal film 560 is formed such that it extends from the magnetic record medium contacting face 568 side to the opposite face 569 along an opposing face of the thin metal film forming portion 559a to the ferromagnetic thin metal film 560. In particular, the ferromagnetic thin metal film 560 is formed over the entire opposing face of the thin metal film forming portion 559a except those portions within the coil winding groove 566 and within the glass groove 567. A ferromagnetic material having a high saturation flux density and superior in soft magnetic characteristic is employed for the ferromagnetic thin metal film 560.

As such ferromagnetic material, any of ferromagnetic metal materials such as Fe—Al—Si alloys, Fe—Al alloys, Fe—Si—Co alloys, Fe—Ni alloys, Fe—Al—Ge alloys, Fe—Ga—Ge alloys, Fe—Si—Ge alloys, Fe—Co—Si—Al alloys or Fe—Ga—Si alloys may be employed, or in order to achieve further improvement in corrosion resistance or abrasion resistance of the Fe—Ga—Si alloys listed above, any of alloys which include Fe, Ga, Co (including those wherein part of Fe is replaced by Co) or Si as a basic component and to which at least one of Ti, Cr, Mn, Zr, Nb, Mo, Ta, W, Ru, Os, Rh, Ir, Re, Ni, Pb, Pt, Hf and V is added may be employed.

Alternatively, any of ferromagnetic amorphous alloys such as, for example, metal-metalloid amorphous alloys such as alloys consisting of one or more of Fe, Ni and Co and one or more of P, C, B and Si or alloys which include any of such alloys as a principal component and contain Al, Ge, Be, Sn, In, Mo, W, Ti, Mn, Cr, Zr, H, Nb or the like, or metal-metal amorphous alloys which include a transition element such as Co, Hf or Zr, a rare earth element or the like as a principal component may be employed.

Among such ferromagnetic materials as listed above, particularly that one which presents a saturation flux density higher than 14 kG is employed preferably because it makes a high recording density of 1.25 $\mu m^2$/bit or more available, and for example, an Fe—Ga—Si—Ru alloy having a saturation flux density of 14.5 kG is preferable. If a ferromagnetic material having such a high saturation flux density is employed, then recording can be performed onto a magnetic tape of a high coercive force without causing magnetic saturation.

A vacuum thin film forming technique such as, for example, a vapor depositing method, a sputtering method or an ion plating method can be employed as a film applying technique for any of the ferromagnetic materials listed above.

The magnetic core portion 562 constituting the second magnetic core half 564 is small in thickness in the sliding direction of a magnetic tape and is made of a ferromagnetic oxide material such as Mn—Zn ferrite or Ni—Zn ferrite similarly to the magnetic core portion 559 described hereinabove. The opposing portion of the magnetic core portion 562 to the ferromagnetic thin metal film 563 is formed such that it is cut away at the opposite sides thereof in a chip widthwise direction and a substantially central portion remains long and slender along the sliding direction of a magnetic tape. A pair of cutaway portions 572 and 573 at which the opposing portion of the magnetic core portion 562 is cut away serve as track width restricting grooves for restricting a track width $Tw_1$ of the magnetic gap $g_1$ of the magnetic head 557 similarly to the magnetic core portion 559 described hereinabove. Accordingly, an elongated core portion 562a defined by the cutaway portions 572 and 573 has a same width as the track width $Tw_1$ of the magnetic gap $g_1$. The elongated core portion 562a will be hereinafter referred to as thin metal film forming portion. It is to be noted that also the thin metal film forming portion 562a is inclined, similarly to the thin metal film forming portion 559a, with a same angle as an azimuth angle $\theta_1$ of the magnetic gap $g_1$ in the same direction as the metal film forming portion 559a described above with respect to the sliding direction of a magnetic tape.

The ferromagnetic thin metal film 563 is formed along the opposing face of the thin metal film forming portion 562a and extends as a continuous film from the magnetic record medium contacting face 568 side to the opposite face 569 remote from the magnetic record medium contacting face 568. A ferromagnetic material similar to that of the ferromagnetic thin metal film 560 is employed for the ferromagnetic thin metal film 563.

The first and second magnetic core halves 561 and 564 constructed in such a manner as described above are abutted with each other at abutting faces thereof provided by the ferromagnetic thin metal films 560 and 563 and are integrally joined to each other as the fusion joining glass 565 is filled in the spacings formed between the opposing cutaway portions 570 and 572 and between the opposing cutaway portions 571 and 573. The first and second magnetic core halves 561 and 564 define the magnetic gap $g_1$ having the track width $Tw_1$ at an interface between the ferromagnetic thin metal films 560 and 563 with the fusion joining glass 565 or a gap spacer interposed between the ferromagnetic thin metal films 560 and 563. The magnetic gap $g_1$ here is provided with the predetermined azimuth angle $\theta_1$ in the clockwise direction with respect to a direction perpendicular to the sliding direction of a magnetic tape.

The azimuth angle $\theta_1$ here is preferably equal to or greater than 10 degrees in order to reduce crosstalk from the magnetic gap $g_2$ of the other magnetic head 558 provided on the common head base 556. A composite magnetic head which was actually produced in accordance with the present invention, and in the composite magnetic head, the azimuth angle $\theta_1$ of the magnetic gap $g_1$ was set to 20 degrees. Meanwhile, the track width $Tw_1$ of the magnetic gap $g_1$ is preferably set greater by +0 $\mu m$ to +3 $\mu m$ than the track pitch P on a magnetic tape because, in the case of ATF (automatic tracking), recording or reproduction is performed while picking up a signal of an adjacent track. It is to be noted that, if the track width $Tw_1$ of the magnetic gap $g_1$ is excessively great, then neighboring crosstalk upon reproduction is high, and therefore, the range described above is most preferable. Particularly, since the track pitch P is set equal to or smaller than 10 $\mu m$, the track width $Tw_1$ of the magnetic gap $g_1$ is 10 $\mu m$ to 13 $\mu m$. In the actually produced composite magnetic head described above, the track width $Tw_1$ was set to 7 $\mu m$ in order to make the track pitch P on a magnetic tape equal to 5 $\mu m$.

Particularly in the magnetic head 557 described above, a thin conductor film 593 for intercepting leakage fluxes from the magnetic gap $g_2$ of the other magnetic head 558 is formed at an opposing face of the magnetic head 557 to the other magnetic head 558 disposed closely in an opposing relationship, in short, the opposing face 562b of the magnetic core portion 562 constituting the second magnetic core half 564. The thin conductor film 593 is formed from a thin conductor film having a low electric specific resistance $\rho$, for example, a thin film made of silver, Cr or aluminum of an electric specific resistance $\rho < 10^{-6}$ $\omega \cdot cm$. The thin conductor film 593 is formed over the entire opposing face 562b of the magnetic core portion 562, for example, by a thin film producing process such as, for example, a technique of wet or dry plating. The film thickness of the thin conductor film 593 is desirably set to 1 $\mu m$ to 50 $\mu m$ in order to intercept leakage fluxes from the other magnetic head 558 with certainty. If the film thickness is smaller than 1 $\mu m$, then it is difficult to intercept leakage fluxes with certainty. It is to be noted that, while the upper limit of the film thickness may be 50 $\mu m$ or more, this is limited by a distance from the magnetic head 558 disposed in an opposing relationship to the same.

If the thin conductor film 593 is provided, then when leakage fluxes from the other magnetic head 558 try to flow into the magnetic head 557, an eddy current is produced in the thin conductor film 593 in accordance with a changing rate of such magnetic fluxes and produces a magnetic field in a direction in which a change of an external magnetic field is prevented. As a result, leakage fluxes from the other magnetic head 558 are intercepted by the thin conductor film 593.

The other magnetic head 558 has a similar construction and includes a third magnetic core half 576 and a fourth magnetic core half 579. The third magnetic core half 576 includes a magnetic core portion 574 made of a ferromagnetic oxide material and a ferromagnetic thin metal film 575 formed on the magnetic core portion 574. Meanwhile, the fourth magnetic core half 579 similarly includes a magnetic core portion 577 made of a ferromagnetic oxide material and a ferromagnetic thin metal film 578. The third and fourth magnetic core halves 576 and 579 are integrally joined to each other at abutting faces thereof provided by the ferromagnetic thin metal films 575 and 578 by fusion joining glass 580.

Also in the magnetic head 558, opposing portions of the magnetic core portions 574 and 577 to the ferromagnetic thin metal films 575 and 578, respectively, are formed, similarly as in the magnetic head 557 described hereinabove, such that they are each cut away at the opposite sides thereof in a chip widthwise direction and a substantially central portion remains long and slender along the sliding direction of a magnetic tape. Two pairs of cutaway portions 581, 582 and 583, 584 at which the opposing portions of the magnetic core portions 574 and 577 are cut away serve as track width restricting grooves for restricting a track width $Tw_2$ of the magnetic gap $g_2$ of the magnetic head 558. Accordingly, elongated core portions 574a and 577a defined by the cutaway portions 581, 582 and 583, 584 have a same width as the track width $Tw_2$ of the magnetic gap $g_2$. The elongated core portions 574a and 577a will each be hereinafter referred to as thin metal film forming portion.

It is to be noted that the thin metal film forming portions 574a and 577a are inclined at a same angle as the azimuth angle $\theta_2$ of the magnetic gap $g_2$ in the opposite direction to that of the thin metal film forming portions 559a and 562a described hereinabove with respect to the sliding direction of a magnetic tape. Meanwhile, a coil winding groove 585 and a glass groove 586 are formed on an opposing face of the magnetic core portion 574 to the ferromagnetic thin metal film 575. A side face 577b of the other magnetic core portion 577 remote from the thin metal film forming portion 577a is inclined in the opposite direction to that of the magnetic core portion 562 of the magnetic head 557 described hereinabove.

Also the ferromagnetic thin metal films 575 and 578 are formed by a vacuum thin film forming technique by applying a ferromagnetic material and extend from the magnetic record medium contacting face 587 side of the magnetic core portion 574 to another face 88 of the magnetic core portion 574 remote from the magnetic record medium contacting face 587 along the opposing faces of the thin metal film forming portion 575 and 578.

In the magnetic head 558, the third and fourth magnetic core halves 576 and 579 are abutted at abutting faces thereof provided by the ferromagnetic thin metal films 575 and 578 and are integrally joined to each other as the fusion joining glass 580 is filled in the spacings formed between the opposing cutaway portions 570 and 572 and between the opposing cutaway portions 571 and 573. The magnetic gap $g_2$ having the track width $Tw_2$ is defined between the ferromagnetic thin metal films 575 and 578. Here, the magnetic gap $g_2$ has the predetermined azimuth angle $\theta_2$ in the clockwise direction with respect to a direction perpendicular to the sliding direction of a magnetic tape. In short, the azimuth of the magnetic gap $g_2$ here is directed reversely to the direction of the azimuth of the magnetic gap $g_1$ of the magnetic gap 557 described hereinabove. It is to be noted that the azimuth angle $\theta_2$ of the magnetic gap $g_2$ is set to the same angle as the azimuth angle $\theta_1$ of the magnetic gap $g_1$ described hereinabove.

Also in the magnetic head 558, a thin conductor film 594 for intercepting leakage fluxes from the magnetic gap $g_1$ of the magnetic head 557 is formed, similarly as in the magnetic head 557 described hereinabove, on an opposing face of the magnetic head 558 to the magnetic head 557, in short, an opposing face 577b of the magnetic core portion 577 constituting the fourth magnetic core half 579. Accordingly, leakage fluxes from the magnetic head 557 opposing to the magnetic head 558 are intercepted with certainty by the thin conductor film 594.

The magnetic heads 557 and 558 constructed in such a manner as described above are disposed closely on the common head base 556 such that they are abutted at opposing faces provided by the thin conductor films 593 and 594 with each other so as to make up a so-called double azimuth composite magnetic head. The magnetic heads 557 and 558 are disposed with an offset D substantially equal to the pitch P of tracks recorded on a magnetic tape 87 shown in FIG. 10 by the magnetic heads 557 and 558 in the track pitch direction indicated by the arrow mark Y in FIG. 21. It is to be noted that the offset D here denotes a distance in the track pitch direction between ends of the magnetic gaps $g_1$ and $g_2$ of the magnetic heads 557 and 558 adjacent the head base 556 in the track widthwise direction.

In particular, the magnetic head 557 is disposed on a spacer 590 having a thickness equal to the offset D and mounted on the head base 556 as shown in FIG. 22. Consequently, the distance in the track widthwise direction between end portions of the magnetic gap $g_1$ of the magnetic head 557 and the magnetic gap $g_2$ of the magnetic head 558 which is mounted directly on the head base 556 is equal to the offset D. Accordingly, the magnetic gap $g_1$ of the magnetic head 557 mounted on the spacer 590 is disposed with the offset D adjacent the head base 556 with respect to the magnetic gap $g_2$ of the magnetic head 558 which is disposed directly on the head base 556.

Here, because the track pitch P on the magnetic tape 87 is equal to or less than 10 $\mu$m, the offset D is set to 10 $\mu$m or less accordingly. In the actually produced composite magnetic head described above, since the track pitch P was 5 $\mu$m, the offset D was equal to 5 $\mu$m. Accordingly, also the thickness of the spacer 590 was similarly 5 $\mu$m.

Further, the magnetic heads 557 and 558 are disposed with an offset GL equal to an offset d between adjacent tracks on the magnetic tape 87 in the head scanning direction indicated by an arrow mark X in FIG. 21. It is to be noted that the offset d between tracks here denotes a distance between ends of adjacent record tracks 89 and 90 in a record area in the head scanning direction. The offset GL denotes a distance between the centers of the track widths $Tw_1$ and $Tw_2$ of the magnetic gaps $g_1$ and $g_2$ of the magnetic heads 557 and 558 in the head scanning direction.

Here, the offset GL is selected so as to assure a record area for a picture image signal and is set, for example, to a value equal to or less than 500 $\mu$m. If the offset GL is greater than 500 $\mu$m, then the picture image signal area is excessively narrow, which is disadvantageous for the reproduction for a long period of time. On the contrary, if the offset GL is excessively small, then the opposing magnetic core portions 562 and 577 are reduced in thickness, and the head efficiency is reduced by a reduction in sectional area of the cores. From such circumstances as described above, in the actually produced composite magnetic head described above, the offset GL was set to 200 µm.

The composite magnetic head constructed in this manner is mounted on a rotary drum (not shown) together with the head base 556. The rotary drum is rotated to scan so that such a record pattern as shown in FIG. 10 is formed by the composite magnetic head on the magnetic tape 87 which is fed relatively along a circumferential face of the rotary drum. In this instance, the feeding rate of the magnetic tape 87 and the speed of rotation of the magnetic heads 557 and 558 per unit time are decided so that the offset GL between the magnetic heads 557 and 558 in the head feeding direction and the offset d between adjacent tracks on the magnetic tape 87 may be equal to each other.

Referring to FIG. 10, the record tracks 89 and 90 on the magnetic tape 87 are recorded by the magnetic heads 557 and 558 of the composite magnetic head with the offset d equal to the offset GL between the magnetic heads 557 and 558 in pair in the head feeding direction. Accordingly, the magnetic heads 557 and 558 come to ends of picture regions 89a and 90a or audio regions 89b and 90b of the respective record tracks 89 and 90. As a result, after recording wherein an audio signal is recorded later is performed readily without having an influence upon any other signal. Further, since recording and/or reproduction are performed simultaneously by the two magnetic heads 557 and 558 integrally disposed on the common head base 556, even if recording or reproduction is performed at a recording density equal to or higher than 1.25 $\mu m^2$/bit onto the magnetic tape 87 having a tape width equal to or less than 8 mm, recording and/or reproduction of a digital picture image signal for a long period of time can be performed without an increase of the bit error rate arising from abnormal track patterns.

For example, in case two magnetic heads having different azimuth angles from each other are disposed in an angularly spaced relationship by 180 degrees on a rotary head and record and/or reproduce similarly at a recording density equal to or higher than 1.25 $\mu m^2$/bit onto and/or from the magnetic tape 87 of 8 mm wide, an abnormal track pattern wherein a track recorded by a preceding one of the magnetic heads and another track recorded by the other following magnetic head disposed in an angularly spaced relationship by 180 degrees overlap partially with each other is caused by the rotary drum which is mounted in an eccentric condition or the like. Consequently, part of the signal recorded by the preceding magnetic head is erased partially by the signal recorded by the following magnetic head, and a sufficient reproduction output cannot be obtained and the bit error rate will be very high. However, with the composite magnetic head described above, since the two magnetic heads 557 and 558 are disposed on the common head base 556, even if the rotary drum is mounted, for example, in an eccentric condition, the record tracks 89 and 90 recorded by the magnetic heads 557 and 558 will be inclined in the same direction and neither of them will overlap with the other record track. Accordingly, a sufficient reproduction output can be obtained and the bit error rate does not become high.

When a signal of the wavelength of 0.3 µm was recorded and/or reproduced at the track pitch of 10 µm onto and/or from a magnetic tape of the tape width of 8 mm in a standard mode (SP) using the actually produced composite magnetic head described above, the recording time was 3 hours. When such signal was recorded and/or reproduced similarly at another track pitch of 5 µm in a double speed mode (LP), the recording time was 6 hours.

Further, in this instance, mutual interference (crosstalk) between the magnetic heads 557 and 558 were measured, and it can be seen that mutual interference is reduced to a very low level as seen from a curve 202 shown in FIG. 23. On the other hand, when the thin conductor films 593 and 594 are not provided (shown by a curve 201 in FIG. 23), it can be seen that mutual interference is high. It is to be noted that FIG. 23 shows data when a thin Cu film of the thickness of 10 µm was employed for the thin conductor films 593 and 594.

As described so far, while, in the composite magnetic head to which the present invention is applied, the thin conductor films 593 and 594 are formed on the opposing faces of both of the magnetic heads 557 and 558, a similar effect can be achieved even when the thin conductor film 593 is provided on either one of the magnetic heads 557 and 558. Further, in order to further assure interception of leakage fluxes, 8-shaped coils may be wound on the magnetic heads 557 and 558.

In the following, a method of producing a magnetic head to which the present invention is applied will be described.

Figure 26:
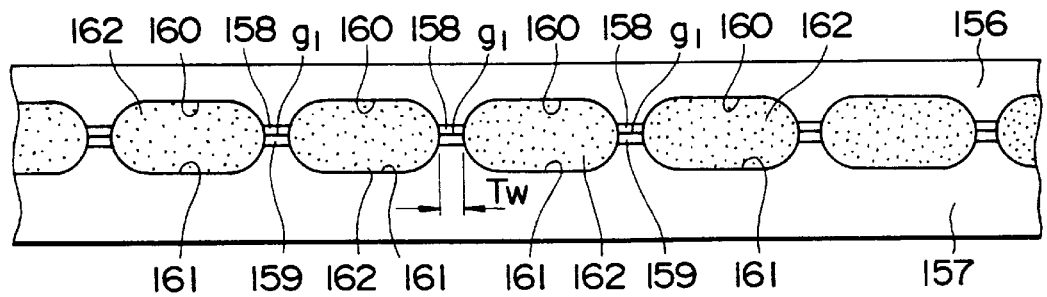
FIGS. 26 to 28 are schematic views showing different successive steps of a process of producing a magnetic head to which the present invention is applied.

In order to produce a magnetic head by the producing method of the present invention, a ferromagnetic material is first sputtered onto principal surfaces of a pair of head core blocks 156 and 157 each in the form of a flat plate made of a magnetic oxide material composed of Mn—Zn ferrite, Ni—Zn ferrite or the like to form ferromagnetic thin metal films 158 and 159 as shown in FIG. 26.

As such ferromagnetic material, any of ferromagnetic metal materials such as Fe—Al—Si alloys, Fe—Al alloys, Fe—Si—Co alloys, Fe—Ni alloys, Fe—Al—Ge alloys, Fe—Ga—Ge alloys, Fe—Si—Ge alloys, Fe—Co—Si—Al alloys or Fe—Ga—Si alloys is employed, or in order to achieve further improvement in corrosion resistance or abrasion resistance of the Fe—Ga—Si alloys listed above, any of alloys which include Fe, Ga, Co (including those wherein part of Fe is replaced by Co) or Si as a basic component and to which at least one of Ti, Cr, Mn, Zr, Nb, Mo, Ta, W, Ru, Os, Rh, Ir, Re, Ni, Pb, Pt, Hf and V is added is employed.

Alternatively, any of ferromagnetic amorphous alloys such as, for example, metal-metalloid amorphous alloys such as alloys consisting of one or more of Fe, Ni and Co and one or more of P, C, B and Si or alloys which include any of such alloys as a principal component and contain Al, Ge, Be, Sn, In, Mo, W, Ti, Mn, Cr, Zr, H, Nb or the like, or metal-metal amorphous alloys which include a transition element such as Co, Hf or Zr, a rare earth element or the like as a principal component is employed.

Among such ferromagnetic materials as listed above, particularly that one which presents a saturation flux density higher than 14 kG is employed preferably in order to achieve a high recording density of 1.25 $\mu m^2$/bit or more available, and for example, an Fe—Ga—Si—Ru alloy having a saturation flux density of 14.5 kG is preferable. If a ferromagnetic material having such a high saturation flux density is employed, then recording can be performed onto a magnetic tape of a high coercive force without causing magnetic saturation.

Meanwhile, a vacuum thin film forming technique such as, for example, a vapor depositing method, a sputtering method or an ion plating method can be employed as a film applying technique for any of the ferromagnetic materials listed above.

Subsequently, track width restricting grooves 160 and 161 for restricting the track widths of magnetic gaps are formed through the ferromagnetic thin metal films 158 and 159 on the head core blocks 156 and 157, respectively. The track width restricting grooves 160 and 161 are formed by a plural number at a cutting distance of head chips in accordance with the number of heads to be produced.

As a result, the ferromagnetic thin metal films 158 and 159 having a same width as the track width will remain between the track width restricting grooves 160 and 161, respectively.

Subsequently, the head core blocks 156 and 157 are abutted with each other with tracks thereof positioned relative to each other, and fusion joining glass 162 is filled into spacings between the opposing track width restricting grooves 160 and 161 to integrally join the head core blocks 156 and 157 to each other.

It is to be noted that, when the head core blocks 156 and 157 are to be joined to each other, a gap film is interposed between the ferromagnetic thin metal films 158 and 159 of them.

As a result, a magnetic gap $g_1$ having a track width Tw is formed between the opposing ferromagnetic thin metal films 158 and 159.

Figure 27:
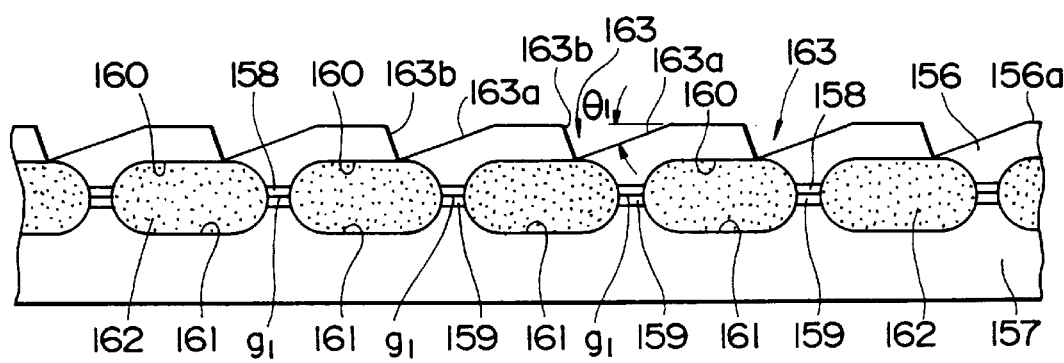

Subsequently, a groove 163 having an angle $\theta_1$ equal to the azimuth angle to be given to the magnetic gap $g_1$ is formed on a face 156a of the head core block 156 remote the joining faces of the ferromagnetic thin metal films 158 and 159 as shown in FIG. 27. Such groove 163 is formed by a plural number at a cutting distance of head chips in accordance with the number of heads to be produced.

In particular, each of the grooves 163 is formed in a depthwise direction on the face 156a of the head core block 156 remote from the joining faces of the ferromagnetic thin metal films 158 and 159 with a rotary grindstone of a rectangular section inclined at an angle $\theta_1$ equal to the azimuth angle to be provided to the magnetic gap $g_1$ as shown in FIG. 27.

As a result, a bottom face 163a of each groove 163 makes an inclined face having the same angle $\theta_1$ a the azimuth angle to be provided to the magnetic gap $g_1$. Further, an intersecting point between a side wall 163b of each groove 163 perpendicular to the bottom face 163a and the bottom face 163a is positioned in the area of the track width restricting groove 160.

Figure 28:
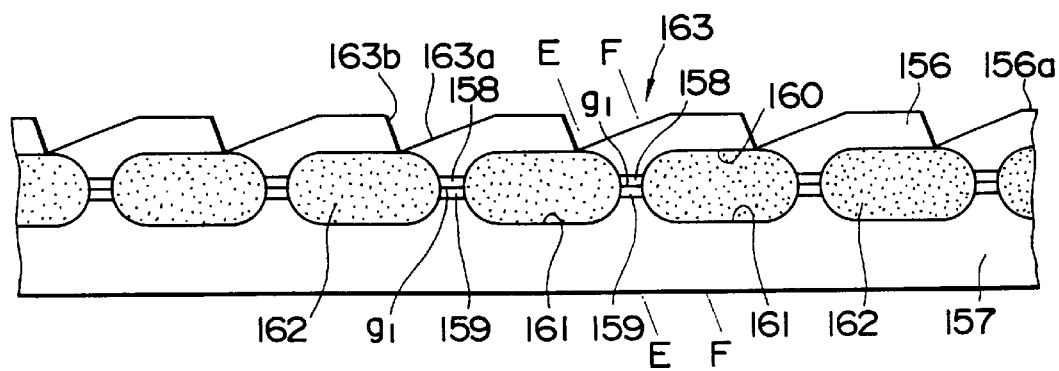

Subsequently, the head core blocks 156 and 157 are cut along lines E—E and F—F of FIG. 28 in a direction substantially perpendicular to the bottom face 163a of each groove 163 such that a head chip thickness may be provided.

Figure 29:
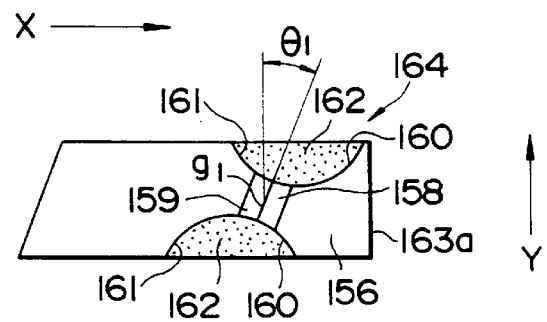
FIG. 29 is a front elevational view showing a magnetic head obtained by the process as viewed from a magnetic record medium contacting face side of the same.

A magnetic head 164 thus obtained has, as shown in FIG. 29, a magnetic gap $g_1$ having the azimuth angle $\theta_1$ inclined at the angle of $\theta_1$ with respect to the track pitch direction indicated by an arrow mark Y while an end face 163a thereof in a head feeding direction indicated by an arrow mark X (bottom face 163a of the groove 163 produced at the preceding step) makes an oblique face which is inclined by an angle equal to the azimuth angle with respect to the magnetic gap $g_1$.

If the groove 163 having the same angle as the azimuth angle $\theta_1$ to be given to the magnetic gap $g_1$ is formed in advance on the head core block 156 in such a manner as described above, then it is not necessary to apply, end face working with a technique of high precision after a head chip is cut away as in the prior art. Accordingly, if the steps described above are adopted, then a magnetic head having an end face which is not parallel to the magnetic gap $g_1$ can be produced readily, and significant improvement in pro-ductivity can be achieved. Further, significant reduction in production cost can be anticipated, and an inexpensive magnetic head can be provided.

While, in the producing method described above, only the end face 163a of the magnetic head 164 is oblique to the magnetic gap $g_1$, in order to assure prevention of appearance of leakage fluxes at end faces, it is desirable to form also the other end face obliquely to the magnetic gap $g_1$.

In the following, a method of forming the opposite end faces of the magnetic head 164 obliquely to the magnetic gap $g_1$ will be described. It is to be noted that a magnetic head produced by the present producing method is constructed such that the core thickness is made a little greater than the core thickness of the magnetic head 164 produced by the preceding producing method in order to assure a core sectional area to achieve improvement in head efficiency.

First, a pair of head core blocks 156 and 157 having a comparatively great thickness and having ferromagnetic thin metal films 158 and 159 formed thereon are abutted with each other with tracks thereof positioned relative to each other similarly as in the producing method described hereinabove. Then, fusion joining glass 162 is filled into spacings between opposing track width restricting grooves 160 and 161 to integrally join the head core blocks 156 and 156 to each other.

Figure 30:
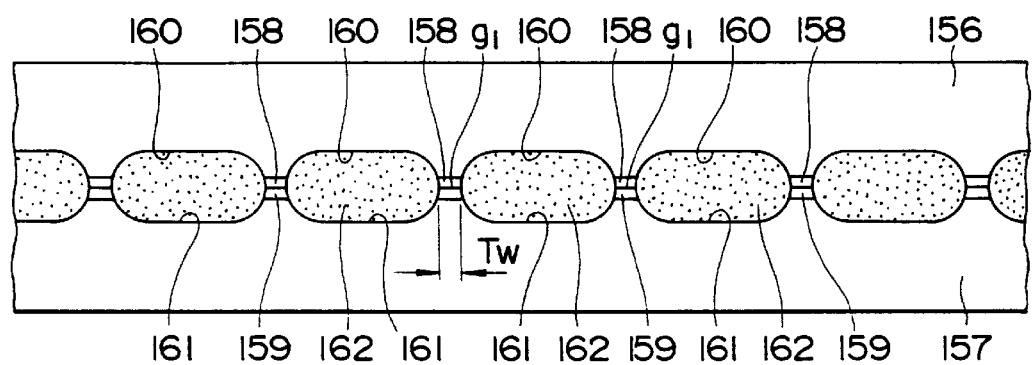
FIGS. 30 to 32 are schematic views showing different successive steps of a modified process of producing a magnetic head to which the present invention is applied.
Figure 31:
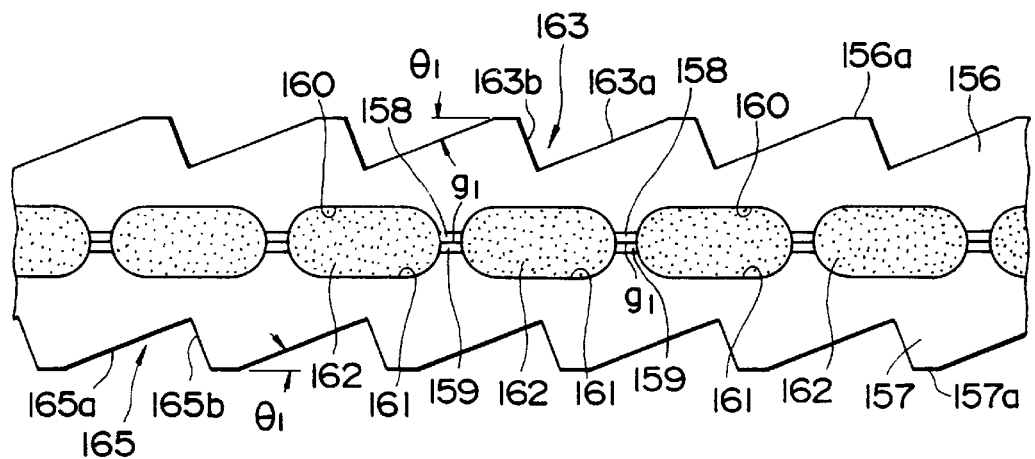

Subsequently, grooves 163 and 165 having an angle $\theta_1$ equal to an azimuth angle to be provided to the magnetic gap $g_1$ are formed on faces 156a and 157a of the thus integrally joined head core blocks 156 and 157 shown in FIG. 30 remote from the joining faces of the ferromagnetic thin metal films 158 and 159, respectively, as shown in FIG. 31.

The grooves 163 and 153 are produced in a similar manner as in the producing method described above such that bottom faces 163a and 153a of the grooves 163 and 165 may extend in parallel to each other and side walls 163b and 165b of the grooves 163 and 165 may be directed in the opposite directions to each other.

Figure 32:
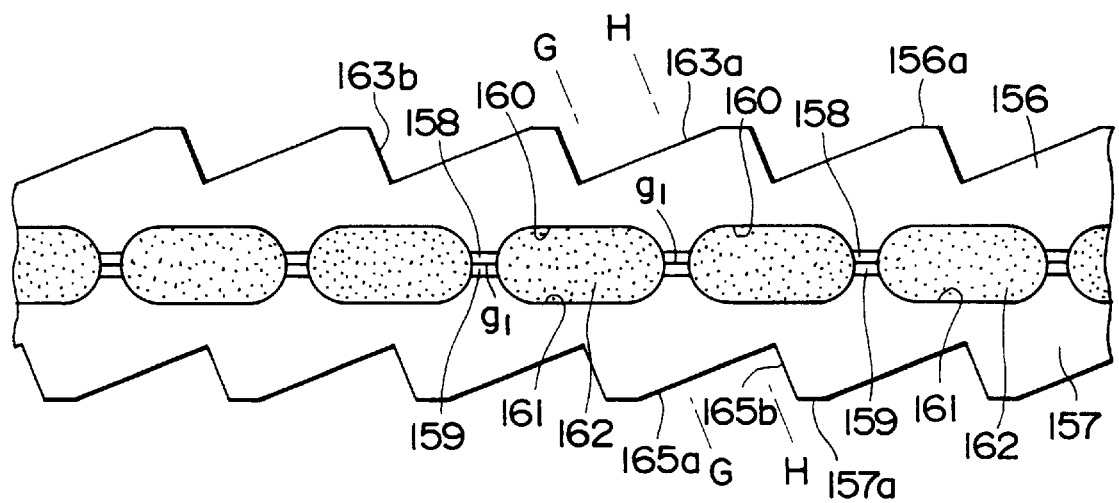

Subsequently, the head core blocks 156 and 157 are cut along lines G—G and H—H of FIG. 32 in a direction substantially perpendicular to the bottom faces 163a and 165a of the grooves 163 and 165 such that a head chip thickness may be provided.

Figure 33:
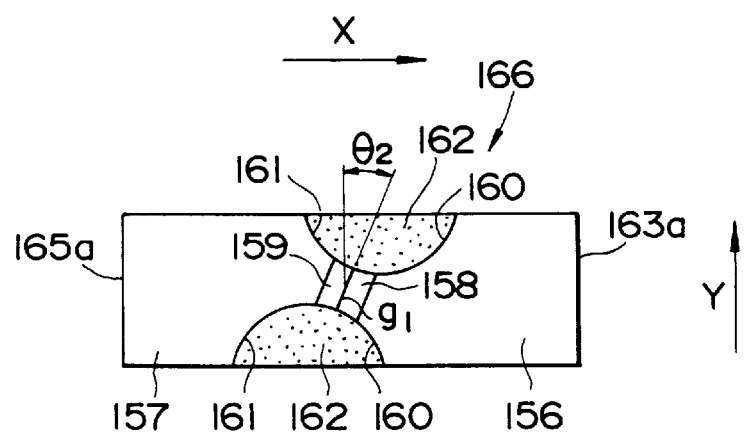
FIG. 33 is a front elevational view showing a condition of a magnetic head obtained by the modified process as viewed from a magnetic record medium contacting face side of the same.
Figure 34:
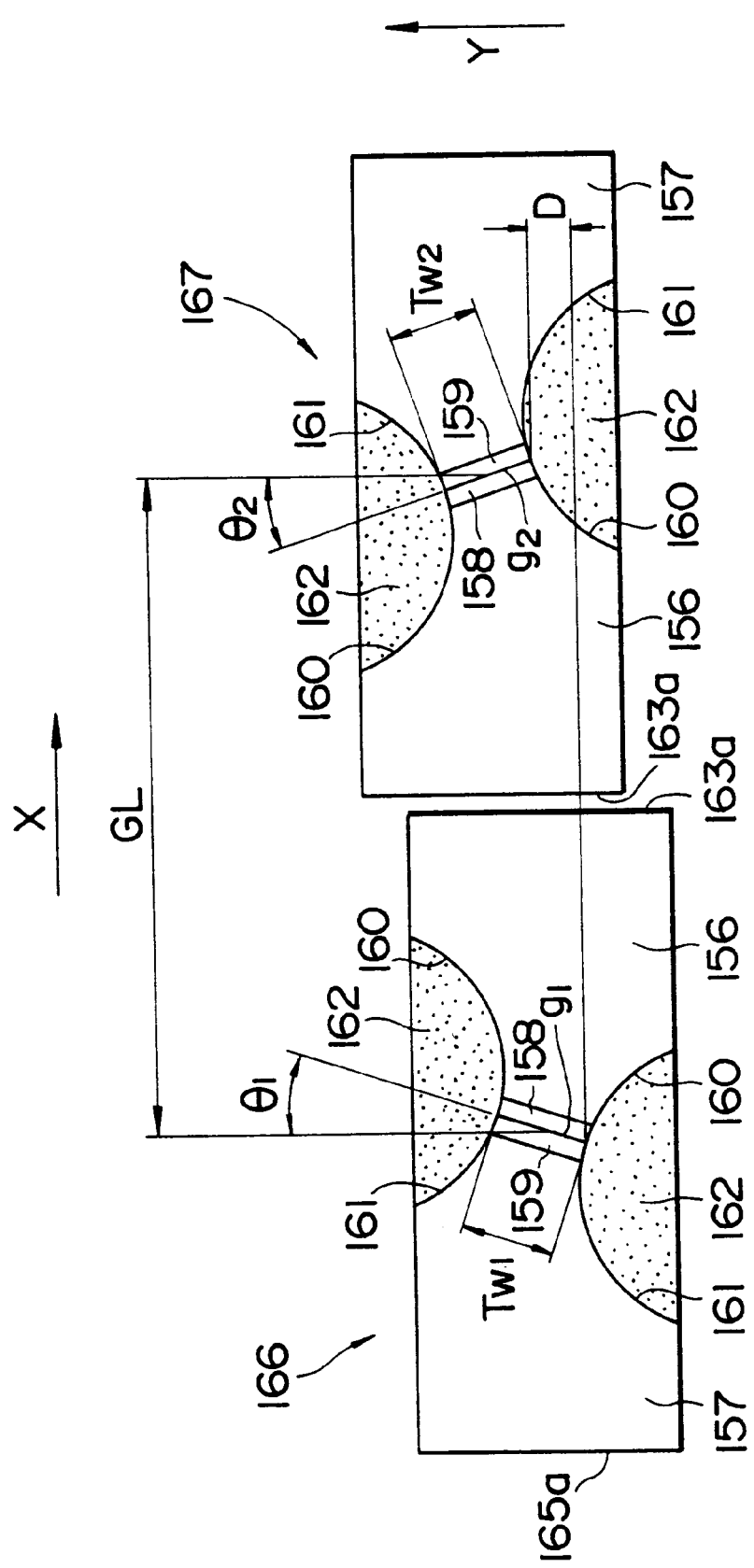
FIG. 34 is a schematic front elevational view showing a composite magnetic head wherein magnetic heads produced by the process of the present invention are disposed closely in an opposing relationship in a head feeding direction as viewed from magnetic record medium contacting faces of the magnetic heads.
Figure 35:
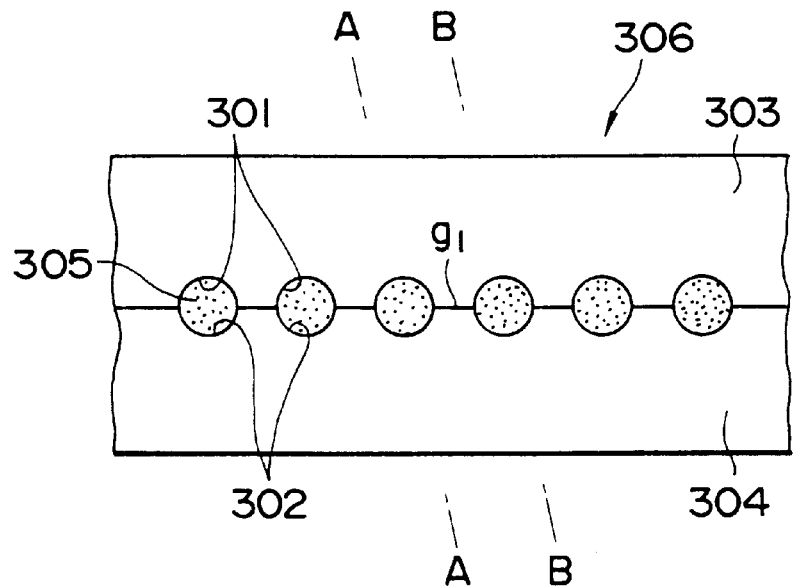
FIG. 35 is a schematic view illustrating a conventional method of applying an azimuth to a magnetic gap.
Figure 36:
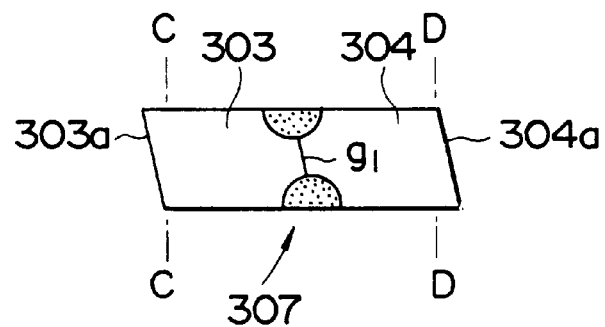
FIG. 36 is a schematic view illustrating machining of an end face of a head chip after cut.
Figure 37:
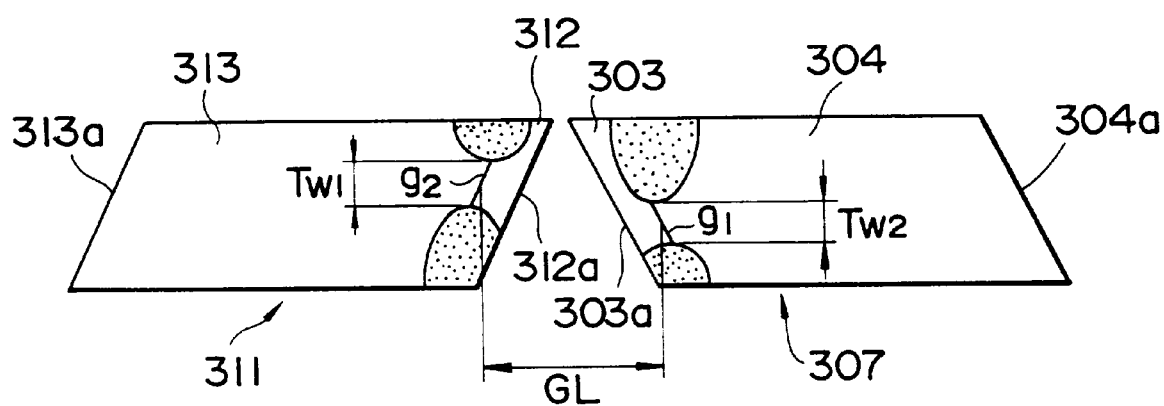
FIG. 37 is a schematic front elevational view showing a composite magnetic head wherein a pair of magnetic heads each having an end face parallel to a magnetic gap are disposed closely in an opposing relationship to each other in a head feeding direction as viewed from a magnetic record medium contacting face side of the composite magnetic head.

A magnetic head 166 thus obtained is constructed such that, as shown in FIG. 33, it has a magnetic gap $g_1$ having an azimuth angle $\theta_1$ inclined at an angle of $\theta_1$ with respect to a track pitch direction indicated by an arrow mark Y and the opposite end faces 163a and 165a in a head feeding direction indicated by an arrow mark X (bottom faces 163a and 165a of the grooves 163 and 165 produced at the preceding step) make oblique faces which are inclined by an angle equal to the azimuth angle with respect to the magnetic gap $g_1$. Accordingly, when recording of a magnetic tape is performed by the present magnetic head 166, since the end faces 163a and 165a in the head feeding direction are oblique to the magnetic gap $g_1$, leakage fluxes will not appear from the end faces 163a and 165a at all. Consequently, leakage fluxes do not remain on a magnetic tape, and accordingly, the reproduction signal will not be deteriorated.

Figure 38:
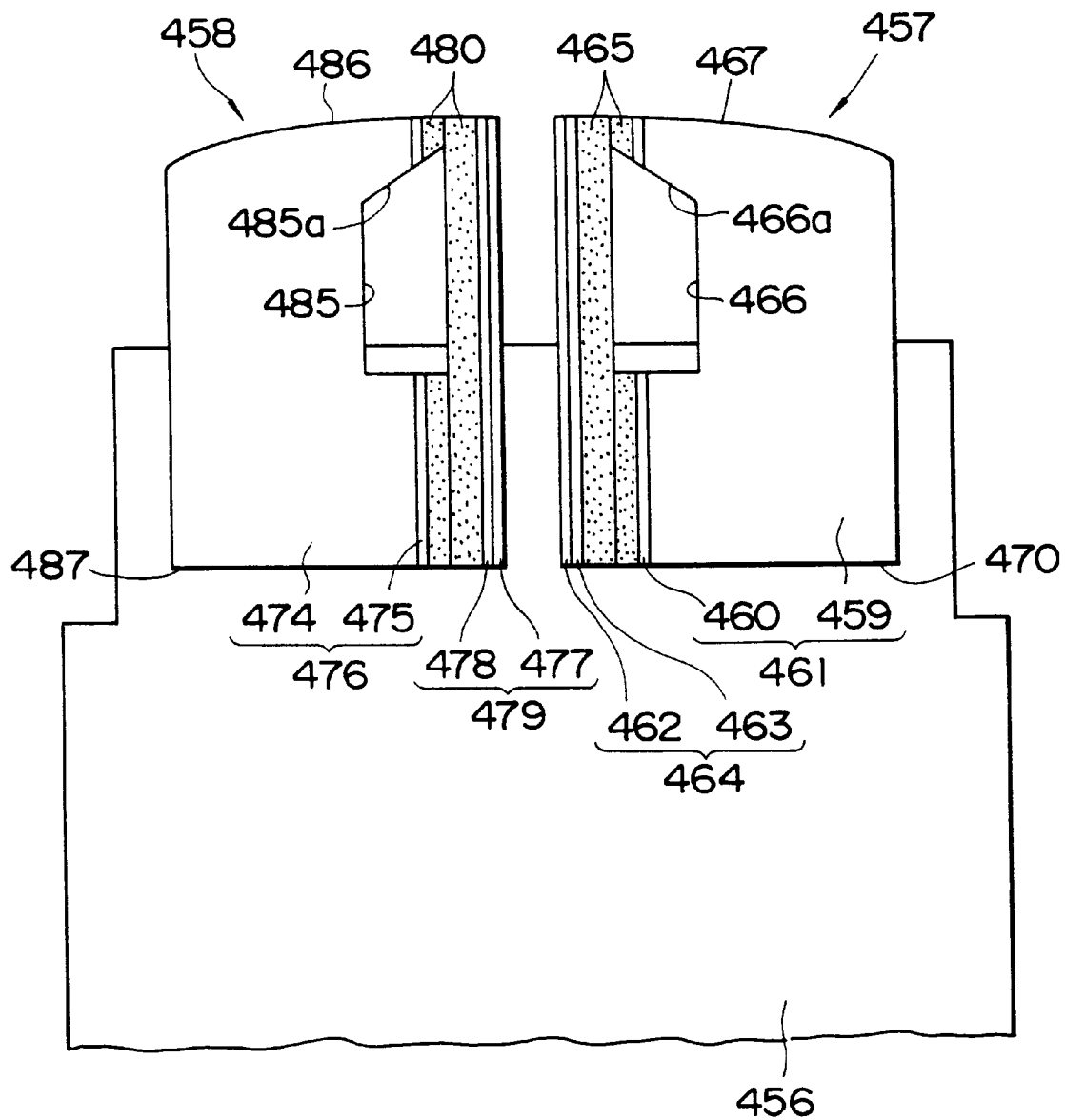
FIG. 38 is a schematic side elevational view of a further composite magnetic head to which the present invention is applied.
Figure 47:
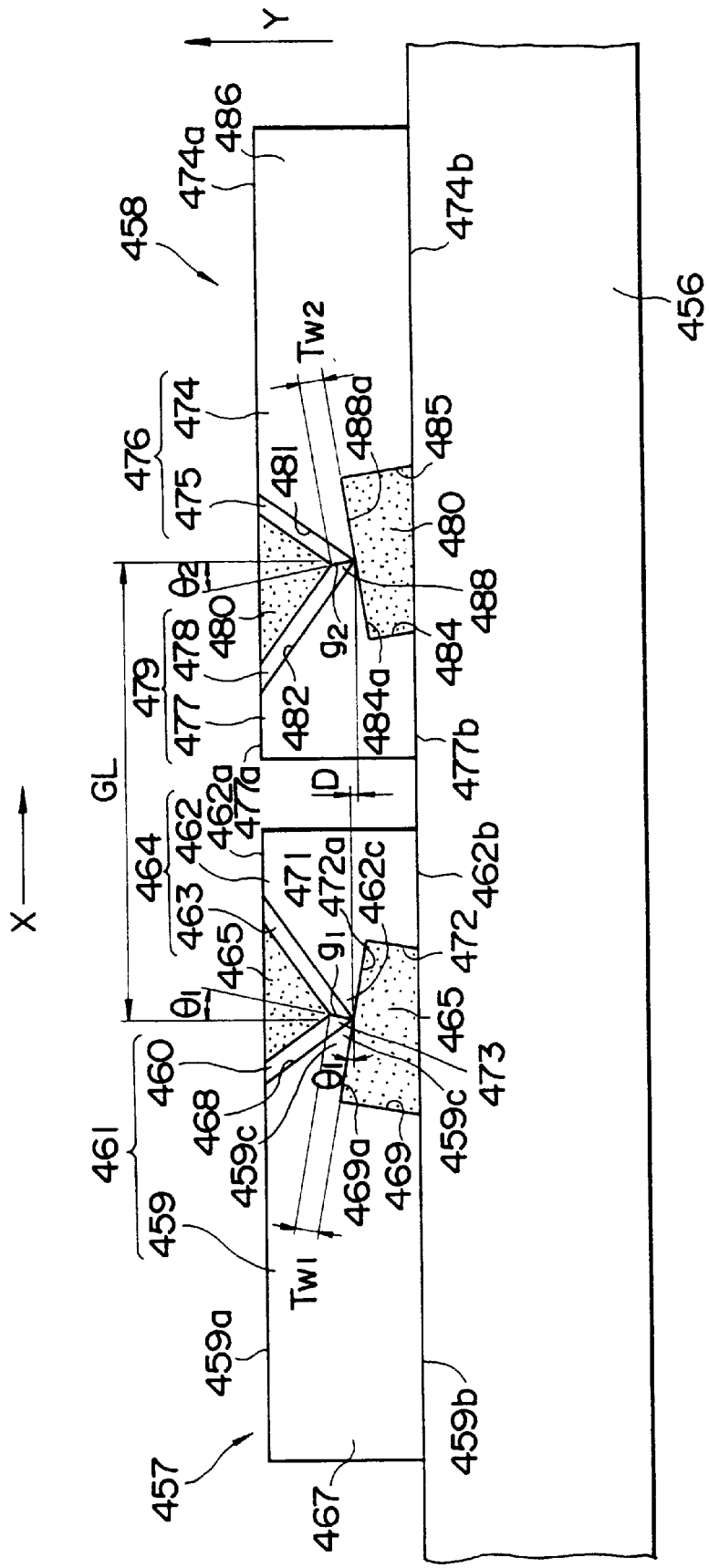
FIG. 47 is a schematic front elevational view of the composite magnetic head of FIG. 38 as viewed from a contacting face side of the same.

Referring now to FIGS. 47 and 38, there is shown a further composite magnetic head to which the present invention is applied. The composite magnetic head of the present embodiment is generally constructed such that a pair of magnetic heads 457 and 458 having magnetic gaps $g_1$ and $g_2$ having different azimuth angles $\theta_1$ and $\theta_2$ from each other are disposed closely in an opposing relationship to each other on a common head base 456 and record onto and reproduce from a magnetic tape simultaneously with each other. It is to be noted that the magnetic heads 457 and 458 correspond to the magnetic heads 13A and 13B shown in FIGS. 1 and 2 and described hereinabove, respectively.

Description is first given of the magnetic head 457. The magnetic head 457 includes a first magnetic core half 461 and a second magnetic core half 464. The first magnetic core half 461 includes a magnetic core portion 459 made of a ferromagnetic oxide material, and a ferromagnetic thin metal film 460 formed on the magnetic core portion 459 using a vacuum thin film forming technique. Meanwhile, the second magnetic core half 464 similarly includes a magnetic core portion 462 made of a ferromagnetic oxide material, and a ferromagnetic thin metal film 463. The first and second magnetic core halves 461 and 464 are integrally joined to each other by means of fusion joining glass 465 at abutting faces thereof provided by the ferromagnetic thin metal films 460 and 463.

The magnetic core portion 459 constituting the first magnetic core half 461 is made of a ferromagnetic oxide material such as, for example, Mn—Zn ferrite or Ni—Zn ferrite, and has, at an opposing face thereof to the second magnetic core half 464, a coil winding groove 466 for winding therein a coil (not shown) for supplying a recording signal or taking out a reproduction signal from a magnetic tape. The coil winding groove 466 is formed as a groove of a substantially rectangular section at a portion of the magnetic core portion 459 adjacent the magnetic record medium contacting face 467 which serves as a face for contacting with a magnetic tape. The depth of a magnetic gap $g_1$ of the magnetic head 457 is restricted by an inclined face 466a of the coil winding groove 466 adjacent the magnetic record medium contacting face 467.

An opposing portion of the magnetic core portion 459 to the second magnetic core half 464 is shaped into a peak by cutting away the opposite sides thereof in a chip thicknesswise direction. In particular, the opposing portion of the magnetic core portion 459 is shaped into a peak by a first cutaway portion 468 inclined from a side face 459a of the magnetic core portion 459 toward the magnetic gap $g_1$ and a second cutaway portion 469 cut away in a substantially rectangular shape in plan in the chip thicknesswise direction from the other side face 459b of the magnetic core portion 459. The peaked portion 459c of the magnetic core portion 459 then is positioned substantially at a mid portion of the chip thickness of the magnetic core portion 459. It is to be noted that an inclined face 469a of the second cutaway portion 469 formed on the side face 459b of the magnetic core portion 459 is formed at a same angle $\theta_1$ as the azimuth angle $\theta_1$ to be applied to the magnetic gap $g_1$ with respect to a head feeding direction indicated by an arrow mark X in FIG. 47.

Meanwhile, the ferromagnetic thin metal film 460 is formed with a predetermined film thickness from the magnetic record medium contacting face 467 side to the back face 470 remote from the magnetic record medium contacting face 467 along the inclined face of the first cutaway portion 468 formed on the side face 459a of the magnetic core portion 459. In particular, the ferromagnetic thin metal film 460 extends from the magnetic record medium contacting face 467 to the back face 470 except that it is cut at the coil winding groove 466. The opposing face of the ferromagnetic thin metal film 460 which forms the magnetic gap $g_1$ is inclined by an angle of $\theta_1$ in the clockwise direction with respect to the track pitch direction indicated by the arrow mark Y in FIG. 47 in order to provide an azimuth to the magnetic gap $g_1$.

A ferromagnetic material having a high saturation flux density and superior in soft magnetic characteristic is employed for the ferromagnetic thin metal film 460. As such ferromagnetic material, any of ferromagnetic metal materials such as Fe—Al—Si alloys, Fe—Al alloys, Fe—Si—Co alloys, Fe—Ni alloys, Fe—Al—Ge alloys, Fe—Ga—Ge alloys, Fe—Si—Ge alloys, Fe—Co—Si—Al alloys or Fe—Ga—Si alloys may be employed, or in order to achieve further improvement in corrosion resistance or abrasion resistance of the Fe—Ga—Si alloys listed above, any of alloys which include Fe, Ga, Co (including those wherein part of Fe is replaced by Co) or Si as a basic component and to which at least one of Ti, Cr, Mn, Zr, Nb, Mo, Ta, W, Ru, Os, Rh, Ir, Re, Ni, Pb, Pt, Hf and V is added may be employed.

Alternatively, any of ferromagnetic amorphous alloys such as, for example, metal-metalloid amorphous alloys such as alloys consisting of one or more of Fe, Ni and Co and one or more of P, C, B and Si or alloys which include any of such alloys as a principal component and contain Al, Ge, Be, Sn, In, Mo, W, Ti, Mn, Cr, Zr, H, Nb or the like, or metal—metal amorphous alloys which include a transition element such as Co, Hf or Zr, a rare earth element or the like as a principal component is employed.

Among such ferromagnetic materials as listed above, particularly that one which presents a saturation flux density higher than 14 kG is employed preferably in order to achieve a high recording density of 1.25 $\mu m^2$/bit or more available, and for example, an Fe—Ga—Si—Ru alloy having a saturation flux density of 14.5 kG is preferable. If a ferromagnetic material having such a high saturation flux density is employed, then recording can be performed onto a magnetic tape of a high coercive force without causing magnetic saturation.

A vacuum thin film forming technique such as, for example, a vapor depositing method, a sputtering method or an ion plating method can be employed as a film applying technique for any of the ferromagnetic materials listed above.

The magnetic core portion 462 constituting the second magnetic core half 464 has a smaller thickness in the head feeding direction than that of the first magnetic core half 461 and is made of a ferromagnetic oxide material such as Mn—Zn ferrite, Ni—Zn ferrite or the like similarly to the magnetic core portion 459 described hereinabove. An opposing portion of the magnetic core portion 462 to the first magnetic core half 461 is formed in a shape substantially symmetrical to the shape of the opposing portion of the magnetic core portion 459 described above with respect to the magnetic gap $g_1$. In particular, the opposing portion of the magnetic core portion 462 is shaped into a peak by a third cutaway portion 471 inclined from a side face 462a of the magnetic core portion 462 toward the magnetic gap $g_1$ and a fourth cutaway portion 472 cut away in a substantially rectangular shape in plan in the chip thicknesswise direction from the other side face 462b of the magnetic core portion 462. The position of an end of the peaked portion 462c of the magnetic core portion 462 then coincides with the position of the end of the peaked portion 459c of the magnetic core portion 459 described hereinabove. Further, an inclined face 472a of the fourth cutaway portion 472 is formed on the other side face 472b of the magnetic core portion 472 at a same angle $\theta_1$ as the azimuth $\theta_1$ to be applied to the magnetic gap $g_1$ with respect to the head feeding direction similarly to the inclined face 469a of the cutaway portion 469 formed on the magnetic core portion 459.

Meanwhile, the ferromagnetic thin metal film 463 is formed as a continuous film with a predetermined film thickness and extends from the magnetic record medium contacting face 467 side to the back face 470 remote from the magnetic record medium contacting face 467 along the inclined face of the cutaway portion 471 formed on the side face 462a of the magnetic core portion 462. Also the opposing face of the ferromagnetic thin metal film 463 which defines the magnetic gap $g_1$ is inclined by an angle of $\theta_1$ in the clockwise direction with respect to the track pitch direction similarly to that of the ferromagnetic thin metal film 460 described above. It is to be noted that a ferromagnetic material similar to that of the ferromagnetic thin metal film 460 described above is employed for the ferromagnetic thin metal film 463.

The first and second magnetic core halves 461 and 464 constructed in such a manner as described above are abutted at abutting faces thereof provided by the ferromagnetic thin metal films 460 and 463 and are integrally joined to each other as the fusion joining glass 465 is filled in a spacing formed between the opposing second cutaway portion 469 and fourth cutaway portion 472 and another spacing formed between the opposing ferromagnetic thin metal films 460 and 463. When the magnetic head 457 is viewed from the magnetic record medium contacting face 467, the ferromagnetic thin metal films 460 and 463 provided obliquely in the opposite directions to each other with respect to the magnetic gap $g_1$ are abutted substantially symmetrically with the magnetic gap $g_1$ interposed therebetween. The abutting shape of them is a substantially V shape in plan. Further, the ferromagnetic thin metal films 460 and 463 are formed at positions on the same side with respect to the track widthwise direction, in short, at higher positions in FIG. 47 than the position of the end of the peaked portion 473 at the abutting faces of the ferromagnetic thin metal films 460 and 463. Looking reversely, the ferromagnetic thin metal films 460 and 463 are not provided at positions on the lower side in FIG. 47 than the position of the end of the peaked portion 473 at the ferromagnetic thin metal films 460 and 463. Meanwhile, the abutting shape of the second and fourth cutaway portions 469 and 472 has a substantially channel shape in plane.

A gap film not shown is interposed at an interface between the abutting faces of the ferromagnetic thin metal films 460 and 463 such that the magnetic gap $g_1$ having a track width $Tw_1$ is defined between the abutting faces of the ferromagnetic thin metal films 460 and 463. The magnetic gap $g_1$ has an azimuth inclined by an angle of $\theta_1$ in the clockwise direction since the abutting faces of the ferromagnetic thin metal films 460 and 463 are inclined at the angle of $\theta_1$. It is to be noted that the azimuth angle $\theta_1$ to be applied to the magnetic gap $g_1$ is preferably equal to or greater than 10 degrees in order to reduce crosstalk from the magnetic gap $g_2$ of the other magnetic head 458 provided on the common head base 456. A composite magnetic head which was actually produced in accordance with the present invention, and in the composite magnetic head, the azimuth angle $\theta_1$ of the magnetic gap $g_1$ was set to 20 degrees.

Meanwhile, the track width $Tw_1$ of the magnetic gap $g_1$ is preferably set greater by +0 $\mu$m to +3 $\mu$m than the track pitch P on a magnetic tape because, in the case of ATF (automatic tracking), recording or reproduction is performed while picking up a signal of an adjacent track. It is to be noted that, if the track width $Tw_1$ of the magnetic gap $g_1$ is excessively great, then neighboring crosstalk upon reproduction is high, and therefore, the range described above is most preferable. Particularly, since the track pitch P is set equal to or smaller than 10 $\mu$m, the track width $Tw_1$ of the magnetic gap $g_1$ is 10 $\mu$m to 13 $\mu$m. In the actually produced composite magnetic head described above, the track width $Tw_1$ was set to 7 $\mu$m in order to make the track pitch P on a magnetic tape equal to 5 $\mu$m.

The other magnetic head 458 has a similar construction and includes a third magnetic core half 476 and a fourth magnetic core half 479. The third magnetic core half 476 includes a magnetic core portion 474 made of a ferromagnetic oxide material and a ferromagnetic thin metal film 475 formed on the magnetic core portion 474. Meanwhile, the fourth magnetic core half 479 similarly includes a magnetic core portion 477 made of a ferromagnetic oxide material and a ferromagnetic thin metal film 478. The third and fourth magnetic core halves 476 and 479 are integrally joined to each other at abutting faces thereof provided by the ferromagnetic thin metal films 475 and 478 by fusion joining glass 480.

Also in the present magnetic head 458, the shapes of opposing portions of the magnetic core portions 474 and 477 are substantially symmetrical with respect to the magnetic gap $g_2$ similarly as in the magnetic head 457 described above. In particular, the opposing portions of the magnetic core portions 474 and 477 are shaped into peaks by fifth and sixth cutaway portions 481 and 482 inclined from side faces 474a and 477a of the magnetic core portions 474 and 477 toward the magnetic gap $g_2$ and seventh and eighth cutaway portions 483 and 484 cut away in substantially rectangular shapes in plan in the chip thicknesswise direction from the other side faces 474b and 477b, respectively. It is to be noted that a coil winding groove 485 is formed on the opposing face of the magnetic core portion 474 to the fourth magnetic core half 479, and the depth of the magnetic gap $g_2$ is restricted by an inclined face 485a of the coil winding groove 485.

Meanwhile, also the ferromagnetic thin metal films 475 and 478 are formed similarly with a predetermined film thickness and extend from the magnetic record medium contacting face 486 side to the back face 487 remote from the magnetic record medium contacting face 486 along the inclined faces of the fifth and sixth cutaway portions 481 and 482. It is to be noted that any of the materials employed for the magnetic head 457 described above is applied as a ferromagnetic material for use with the ferromagnetic thin metal films 475 and 478.

In the present magnetic head 458, the third and fourth magnetic core halves 476 and 479 are abutted at abutting faces thereof provided by the ferromagnetic thin metal films 475 and 478 and are integrally joined to each other as the fusion joining glass 480 is filled in a spacing defined between the opposing ferromagnetic thin metal films 475 and 478 and another spacing defined between the seventh and eighth cutaway portions 485 and 484. Also in the magnetic head 458, the abutting shape of the ferromagnetic thin metal films 475 and 478 extending obliquely with respect to the magnetic gap $g_2$ is a substantially V shape in plan and is displaced in the same direction with respect to the track widthwise direction. It is to be noted that the position of the peaked portion 488 at the abutting faces of the ferromagnetic thin metal films 475 and 478 is set to a position displaced by an offset D on the lower side in FIG. 47 than the position of the end of the peaked portion 473 at the ferromagnetic thin metal films 460 and 463 of the magnetic head 457 described hereinabove.

The magnetic gap $g_2$ is inclined by an angle of $\theta_2$ in the direction opposite to the direction of the azimuth of the magnetic gap $g_1$ of the magnetic head 457 described hereinabove, that is, in the counterclockwise direction.

Meanwhile, the track width $Tw_2$ of the magnetic gap $g_2$ is formed equal to the track width $Tw_1$ of the magnetic head 457. In the actually produced composite magnetic head described above, both of the track widths $Tw_1$ and $Tw_2$ of the magnetic gaps $g_1$ and $g_2$ were set to 7 μm. Further, the inclined faces 485a and 484a of the seventh and eighth cutaway portions 485 and 484 are inclined in the same direction at an angle equal to the azimuth angle $\theta_2$ with respect to the head feeding direction.

The magnetic heads 457 and 458 in pair constructed in such a manner as described above are disposed closely in an opposing relationship to the head feeding direction such that part of a record pattern recorded onto a magnetic tape by the preceding magnetic head 458 is overwritten by the following magnetic head 457 to effect recording and/or reproduction. In particular, the magnetic heads 457 and 458 in pair are provided on the common head base 456 such that the peaked portions 473 and 488 of the ferromagnetic thin metal films 460, 463 and 475, 478 are disposed on the overwritten side to be overwritten. As a result, since the track positions of the magnetic gaps $g_1$ and $g_2$ are formed in a displaced condition in the track pitch direction, only if the magnetic heads 457 and 458 in pair are disposed on the common head base 456, one of a pair of tracks recorded by them is overlapped with the other track at a distance of the offset D.

It is to be noted that the offset D here denotes a distance between ends of the magnetic heads 457 and 458 in the track pitch direction adjacent the head base 456 in the track widthwise direction of the magnetic gaps $g_1$ and $g_2$. Here, since the track pitch P on the magnetic tape 87 is equal to or less than 10 μm, the offset D is made equal to or less than 10 μm accordingly. In the actually produced composite magnetic head described above, since the track pitch P on a magnetic tape was 5 μm, the offset D was made equal to 5 μm accordingly.

The magnetic heads 457 and 458 are disposed in an opposing relationship with an offset GL equal to an offset d between tracks on the magnetic tape 87 shown in FIG. 10 in the head feeding direction. It is to be noted that the offset d between tracks here denotes a distance between ends of record tracks 89 and 90 in a record area in the head feeding direction. The offset GL denotes a distance between the centers of the track widths $Tw_1$ and $Tw_2$ of the magnetic gaps $g_1$ and $g_2$ of the magnetic heads 457 and 458 in the head feeding direction.

Here, the offset GL is selected so as to assure a record area for a picture image signal and is set, for example, to a value equal to or less than 500 μm. If the offset GL is greater than 500 μm, then the picture image signal area is excessively narrow, which is disadvantageous for the reproduction for a long period of time. On the contrary, if the offset GL is excessively small, then the opposing magnetic core portions 562 and 577 are reduced in thickness, and the head efficiency is reduced by a reduction in sectional area of the cores. In the actually produced composite magnetic head described above, the offset GL was set to 200 μm taking assurance of a picture image area and a head efficiency into consideration.

In the composite magnetic head wherein the magnetic heads 457 and 458 are mounted on the common head base 456 as described above, it is mounted on a rotary drum (not shown) together with the head base 456. The rotary dram is rotated to scan so that such a record pattern as shown in FIG. 10 is formed by the composite magnetic head on the magnetic tape 87 which is fed relatively along a circumferential face of the rotary drum. In this instance, the feeding rate of the magnetic tape 87 and the speed of rotation of the magnetic heads 457 and 458 per unit time are decided so that the offset GL between the magnetic heads 457 and 458 in the head feeding direction and the offset d between adjacent tracks on the magnetic tape 87 may be equal to each other.

Figure 39:
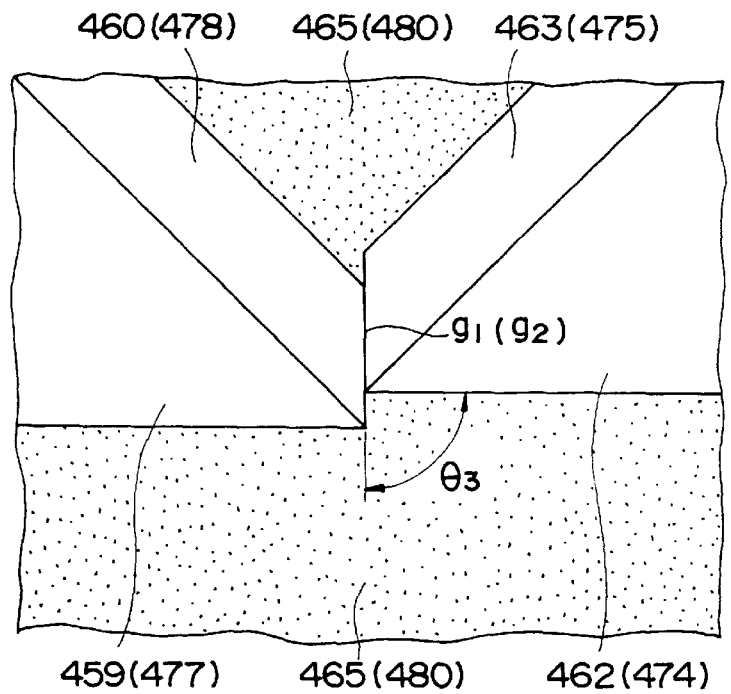
FIG. 39 is a schematic enlarged front elevational view of the composite magnetic head of FIG. 38 showing a condition wherein ferromagnetic thin metal films displaced in a track widthwise direction as viewed from a contacting face side of the composite magnetic head.
Figure 40:
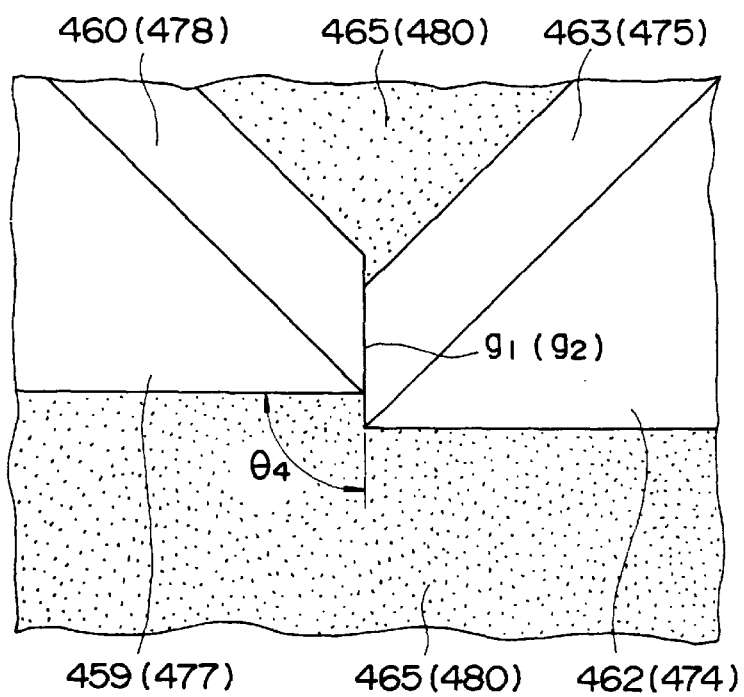
FIG. 40 is a similar view but showing another condition wherein the ferromagnetic thin metal films are displaced in the opposite track widthwise direction to that in FIG. 39.
Figure 42:
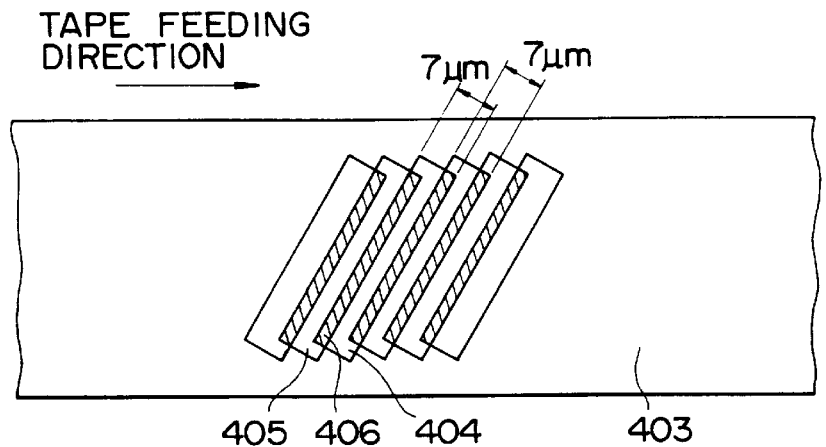
FIG. 42 is a diagrammatic view illustrating recording of a magnetic tape by means of a pair of magnetic heads.
Figure 43:
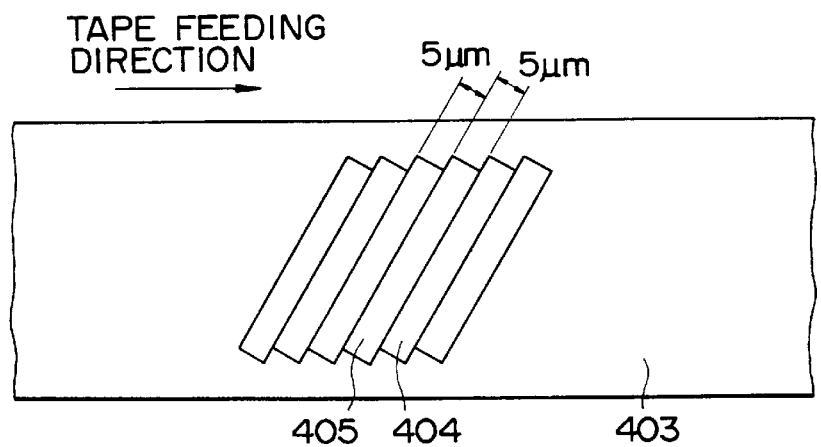
FIG. 43 is a similar view but showing a tape format of a magnetic tape recorded by means of a pair of magnetic heads.
Figure 44:
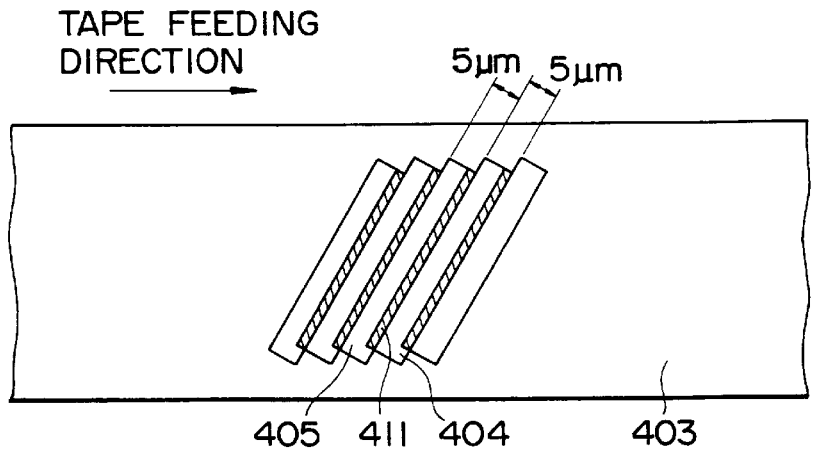
FIG. 44 is a similar view illustrating tracks recorded on a magnetic tape side-erased by leakage magnetic fluxes produced by abutting portions of ferromagnetic thin metal films displaced in a track widthwise direction.
Figure 45:
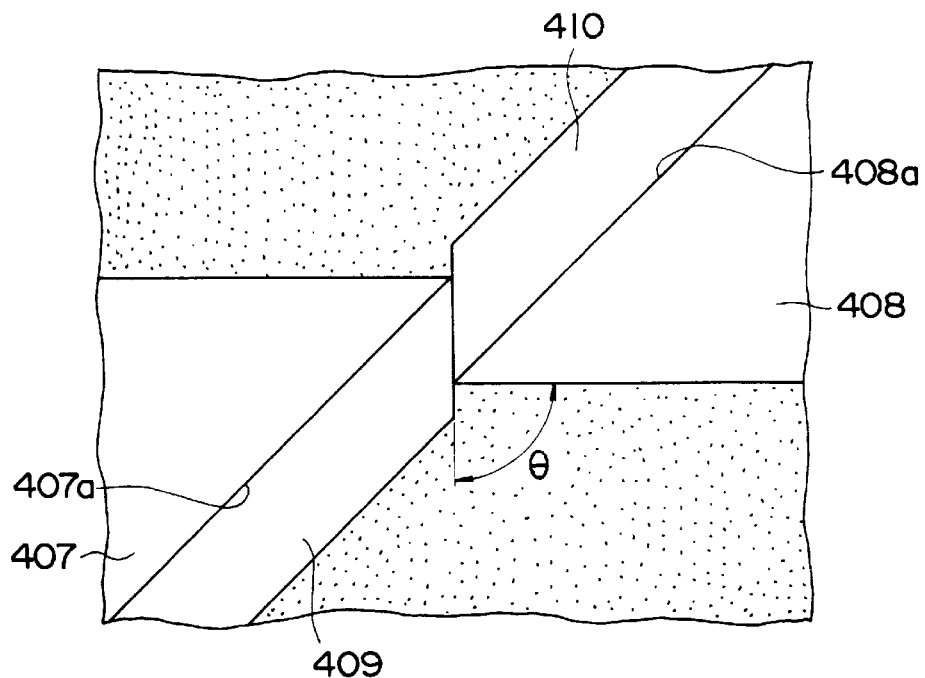
FIG. 45 is an enlarged schematic front elevational view of the magnetic head of FIG. 41 wherein the ferromagnetic thin metal films are displaced in a track widthwise direction as viewed from a contacting face side of the same.
Figure 46:
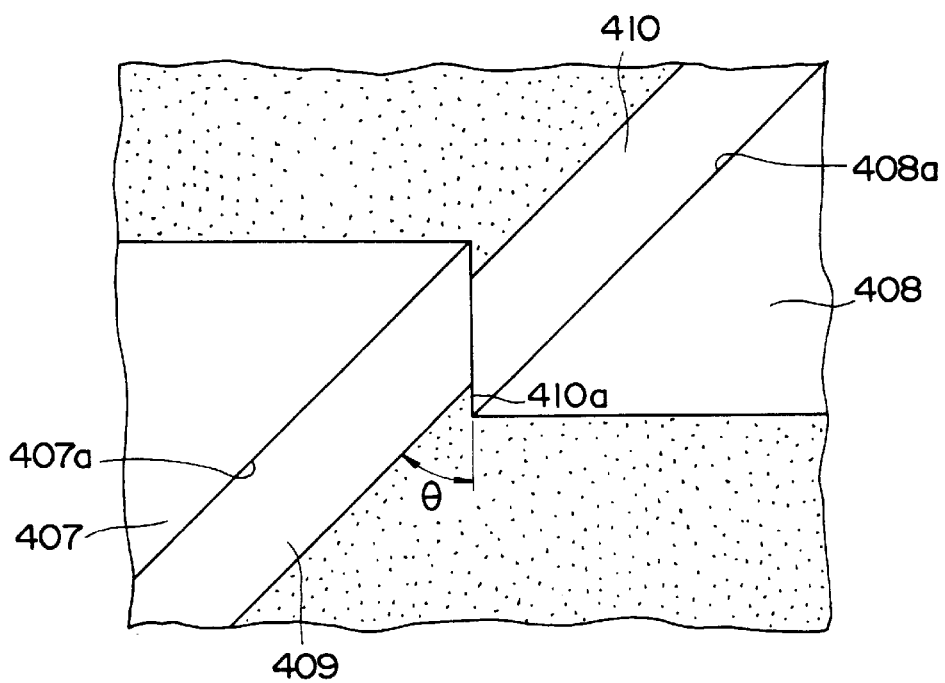
FIG. 46 is a similar view but showing the magnetic head of FIG. 41 wherein the ferromagnetic thin metal film are displaced in the opposite track widthwise direction to that in FIG. 45.

The record tracks 89 and 90 on the magnetic tape 87 are recorded by the composite magnetic head described above such that part of the record track 89 recorded by the preceding magnetic head 458 is overwritten by the record track 91 of the following magnetic head 457. As a result, the record tracks 89 and 90 are recorded at a track pitch P=5 μm as shown in FIG. 10. In this instance, in case the abutting positions of the ferromagnetic thin metal films 460, 463 and 475, 478 of the magnetic heads 457 and 458 are displaced in a track widthwise direction as shown, for example, in FIG. 39 or 40, leakage fluxes appear from edges of those of the ferromagnetic thin metal films 460, 463 and 475, 478 displaced to the overwritten side to be overwritten. However, with the magnetic heads 457 and 458 of the present composite magnetic head, since the ferromagnetic thin metal films 460, 463 and 475, 478 provided obliquely to the magnetic gaps $g_1$ and $g_2$ are provided on the same side with respect to the track widthwise direction, to whichever side the ferromagnetic thin metal films 460, 463 and 475, 478 are displaced in the track widthwise direction, the angles $\theta_3$ and $\theta_4$ defined by those of the ferromagnetic thin metal films 460, 463 and 475, 478 displaced to the overwritten side and opposing ones of the magnetic core portions 459, 462 and 474, 477 will not make acute angles. Accordingly, the leakage magnetic fluxes from the edges of the ferromagnetic thin metal films 460, 463 and 475, 478 are weak, and occurrence of a side-erased gray zone can be suppressed and a sufficiently high S/N ratio can be obtained.

Further, the record tracks 89 and 90 on the magnetic tape 87 are recorded by the magnetic heads 457 and 458 of the composite magnetic head with the offset d equal to the offset GL between the magnetic heads 457 and 458 in pair in the head scanning direction. Accordingly, the magnetic heads 457 and 458 come to ends of picture regions 89a and 90a or audio regions 89b and 90b of the respective record tracks 89 and 90. As a result, after recording wherein an audio signal is recorded later is performed readily without having an influence upon any other signal. Further, since recording and/or reproduction are performed simultaneously by the two magnetic heads 457 and 458 disposed on the common head base 56, even if recording or reproduction is performed at a recording density equal to or higher than 1.25 μm²/bit onto the magnetic tape 87 having a tape width equal to or less than 8 mm, recording and/or reproduction of a digital picture image signal for a long period of time can be performed without an increase of the bit error rate arising from abnormal track patterns.

Here, for example, in case two magnetic heads having different azimuth angles from each other are disposed in an angularly spaced relationship by 180 degrees on a rotary head and record and/or reproduce similarly at a recording density equal to or higher than 1.25 μm²/bit onto and/or from the magnetic tape 87 of 8 mm wide, an abnormal track pattern wherein a track recorded by a preceding one of the magnetic heads and another track recorded by the other following magnetic head disposed in an angularly spaced relationship by 180 degrees overlap partially with each other is caused by the rotary drum which is mounted in an eccentric condition or the like. Consequently, part of the signal recorded by the preceding magnetic head is erased partially by the signal recorded by the following magnetic head, and a sufficient reproduction output cannot be obtained and the bit error rate will be very high. However, with the composite magnetic head described above, since the two magnetic heads 457 and 458 are disposed on the common head base 456, even if the rotary drum is mounted, for example, in an eccentric condition, the record tracks 89 and 90 recorded by the magnetic heads 457 and 458 will be inclined in the same direction and neither of them will overlap with the other record track. Accordingly, a sufficient reproduction output can be obtained and the bit error rate does not become high.

In the actually produced composite magnetic head described above, when a signal of the wavelength of 0.3 $\mu$m was recorded and/or reproduced at the track pitch of 10 $\mu$m onto and/or from a magnetic tape of the tape width of 8 mm in a standard mode (SP), the recording time was 3 hours. When such signal was recorded and/or reproduced similarly at another track pitch of 5 $\mu$m in a double speed mode (LP), the recording time was 6 hours.

Having now fully described the invention, it will be apparent to one of ordinary skill in the art that many changes and modifications can be made thereto without departing from the spirit and scope of the invention as set forth herein.

We claim:

1. A composite magnetic head comprising:

a pair of magnetic heads having magnetic gaps having different azimuth angles from each other and disposed closely in an opposing relationship to each other in a head feeding direction to define respective track widths and a track pitch, said heads further having respective faces which are spaced from each other in opposing relation; and a thin conductor film formed on at least one of said faces of said magnetic heads for intercepting leakage fluxes from the magnetic gap of the other magnetic head, the thin conductor film having a thickness and being located such that the track pitch formed by the magnetic heads is substantially independent of the thickness of the thin conductor film.

2. A composite magnetic head according to claim 1, wherein said thin conductor film is made of a conductor having a specific resistance lower than $10^{-6}$ $\omega$·cm.

3. A composite magnetic head according to claim 2, wherein said thin conductor film is selected from the group consisting of silver, chromium and aluminum alloys.

4. A composite magnetic head according to claim 2, wherein said thickness of said thin conductor film ranges from 1 $\mu$m to 50 $\mu$m.

5. A composite magnetic head according to claim 1, wherein said thin conductor film has a thickness ranging from 1 $\mu$m to 50 $\mu$m.

* * * * *